US011451481B2

United States Patent

(12) United States Patent
Kubo et al.

(10) Patent No.: US 11,451,481 B2
(45) Date of Patent: Sep. 20, 2022

(54) NETWORK CONTROL APPARATUS AND NETWORK CONTROL METHOD

(71) Applicant: NIPPON TELEGRAPH AND TELEPHONE CORPORATION, Tokyo (JP)

(72) Inventors: Takahiro Kubo, Tokyo (JP); Yu Nakayama, Tokyo (JP); Hiroyuki Uzawa, Tokyo (JP); Daisuke Hisano, Tokyo (JP); Yoichi Fukada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/257,720

(22) PCT Filed: Jul. 19, 2019

(86) PCT No.: PCT/JP2019/028440

§ 371 (c)(1),
(2) Date: Jan. 4, 2021

(87) PCT Pub. No.: WO2020/022209

PCT Pub. Date: Jan. 30, 2020

(65) Prior Publication Data

US 2021/0176177 A1 Jun. 10, 2021

(30) Foreign Application Priority Data

Jul. 23, 2018 (JP) ............................ JP2018-137993

(51) Int. Cl.
*H04L 47/22* (2022.01)
*H04W 28/02* (2009.01)

(52) U.S. Cl.
CPC ....... *H04L 47/225* (2013.01); *H04W 28/0252* (2013.01); *H04W 28/0289* (2013.01)

(58) Field of Classification Search
CPC ............ H04L 47/225; H04W 28/0252; H04W 28/0289
See application file for complete search history.

(56) References Cited

U.S. PATENT DOCUMENTS

2003/0145236 A1 7/2003 Tateoka
2004/0064738 A1 4/2004 Kanno et al.
(Continued)

FOREIGN PATENT DOCUMENTS

JP 2003224607 A 8/2003
JP 2004164553 A 6/2004
(Continued)

OTHER PUBLICATIONS

Docomo, "Docomo 5G White Paper", Sep. 2014. <https://www.nttdocomo.co.jp/corporate/technology/whitepaper_5g/>.

(Continued)

*Primary Examiner* — Donald L Mills
(74) *Attorney, Agent, or Firm* — Harness, Dickey & Pierce, P.L.C.

(57) ABSTRACT

A data collection unit of an NW controller (6) collects, from an L2SW (5) constituting an L2NW (4), uplink observation data indicating traffic volume of a session request packet addressed to an application server 2 and downlink observation data indicating traffic volume of a session response packet transmitted from the application server 2, which are acquired by observing packets input to the L2SW (5). A control unit changes shaping rate of the packets addressed to the application server (2) through the L2SW (5) included in the L2NW (4) based on a ratio between the traffic volume indicated by the uplink observation data and the traffic volume indicated by the downlink observation data, or a ratio between an increment of the traffic volume acquired (Continued)

from the uplink observation data and an increment of the traffic volume acquired from the downlink observation data.

8 Claims, 18 Drawing Sheets

(56) References Cited

U.S. PATENT DOCUMENTS

2009/0296668 A1* 12/2009 Capone ............. H04W 72/1257
370/337
2015/0063113 A1* 3/2015 Yoshida .................. H04L 45/38
370/235
2019/0182712 A1* 6/2019 Watanabe ............. H04L 47/805
2019/0297536 A1* 9/2019 Kang .................... H04L 47/193

FOREIGN PATENT DOCUMENTS

JP 2014158079 A 8/2014
JP 2015023364 A 2/2015

OTHER PUBLICATIONS

Craig Gunther, "What's New in the World of IEEE 802.1 TSN", Standards News, IEEE Communications Magazine, Communications Standards Supplement, Sep. 2016, pp. 12-15.
Takahiro Kubo et al., Evaluation of Latency for Offering a Diversity of Services in the Layer 2 Network, IEICE Communication Society Conference 2016, Sep. 2016, B-8-25, p. 155.

* cited by examiner

| APPLICATION SERVER | L2SW#1 | L2SW#2 | L2SW#3 | L2SW#4 |
|---|---|---|---|---|
| IP-1 | 3 | 2 | 2 | 1 |
| IP-2 | 3 | 2 | 2 | 1 |
| IP-3 | 3 | 2 | 2 | 1 |
| IP-4 | 3 | 2 | 2 | 1 |

| APPLICATION SERVER | SESSION REQUEST PACKET | INPUT DATA RATE | INPUT DATA AMOUNT |
|---|---|---|---|
| IP-1 | 0 | D_up1 | M_up1 |
| IP-1 | 1 | D_up2 | M_up2 |
| IP-2 | 0 | D_up3 | M_up3 |
| IP-2 | 1 | D_up4 | M_up4 |
| IP-3 | 0 | D_up5 | M_up5 |
| IP-3 | 1 | D_up6 | M_up6 |

Fig. 7

| APPLICATION SERVER | SESSION REQUEST PACKET | INPUT DATA RATE | INPUT DATA AMOUNT |
|---|---|---|---|
| IP-1 | 0 | D_down1 | M_down1 |
| IP-1 | 1 | D_down2 | M_down2 |
| IP-2 | 0 | D_down3 | M_down3 |
| IP-2 | 1 | D_down4 | M_down4 |
| IP-3 | 0 | D_down5 | M_down5 |
| IP-3 | 1 | D_down6 | M_down6 |

Fig. 8

| APPLICATION SERVER | SESSION REQUEST PACKET | PREVIOUS INPUT DATA RATE | PREVIOUS INPUT DATA AMOUNT |
|---|---|---|---|
| IP-1 | 0 | PD_up1 | PM_up1 |
| IP-1 | 1 | PD_up2 | PM_up2 |
| IP-2 | 0 | PD_up3 | PM_up3 |
| IP-2 | 1 | PD_up4 | PM_up4 |
| IP-3 | 0 | PD_up5 | PM_up5 |
| IP-3 | 1 | PD_up6 | PM_up6 |

Fig. 14

| APPLICATION SERVER | SESSION REQUEST PACKET | INPUT DATA RATE INCREMENT |
|---|---|---|
| IP-1 | 0 | V_up1 |
| IP-1 | 1 | V_up2 |
| IP-2 | 0 | V_up3 |
| IP-2 | 1 | V_up4 |
| IP-3 | 0 | V_up5 |
| IP-3 | 1 | V_up6 |

Fig. 15

| APPLICATION SERVER | SESSION RESPONSE PACKET | PREVIOUS INPUT DATA RATE |
|---|---|---|
| IP-1 | 0 | P_down1 |
| IP-1 | 1 | P_down2 |
| IP-2 | 0 | P_down3 |
| IP-2 | 1 | P_down4 |
| IP-3 | 0 | P_down5 |
| IP-3 | 1 | P_down6 |

Fig. 16

| APPLICATION SERVER | SESSION RESPONSE PACKET | INPUT DATA RATE INCREMENT |
|---|---|---|
| IP-1 | 0 | V_down1 |
| IP-1 | 1 | V_down2 |
| IP-2 | 0 | V_down3 |
| IP-2 | 1 | V_down4 |
| IP-3 | 0 | V_down5 |
| IP-3 | 1 | V_down6 |

Fig. 17

| APPLICATION SERVER | SESSION REQUEST PACKET | PROCESSIBLE DATA AMOUNT | PROCESSIBLE DATA RATE | PROCESSIBLE DATA RATE INCREMENT |
|---|---|---|---|---|
| IP-1 | 0 | Mapp_up1 | Dapp_up1 | Vapp_up1 |
| IP-1 | 1 | Mapp_up2 | Dapp_up2 | Vapp_up2 |
| IP-2 | 0 | Mapp_up3 | Dapp_up3 | Vapp_up3 |
| IP-2 | 1 | Mapp_up4 | Dapp_up4 | Vapp_up4 |
| IP-3 | 0 | Mapp_up5 | Dapp_up5 | Vapp_up5 |
| IP-3 | 1 | Mapp_up6 | Dapp_up6 | Vapp_up6 |

Fig. 19

NETWORK CONTROL APPARATUS AND NETWORK CONTROL METHOD

CROSS-REFERENCE TO RELATED APPLICATIONS

This application is a 371 U.S. National Phase of International Application No. PCT/JP2019/028440 filed on Jul. 19, 2019, which claims priority to Japanese Application No. 2018-137993 filed on Jul. 23, 2018. The entire disclosures of the above applications are incorporated herein by reference.

TECHNICAL FIELD

The present invention relates to a network control device and a network control method.

BACKGROUND ART

In recent years, a Centralized Radio Access Network (C-RAN) configuration has been studied for efficiently accommodating increasing mobile traffic (see, for example, Non Patent Literature 1). In C-RAN, a large number of pieces of Radio Equipment (RE) are arranged at a high density and are connected to Radio Equipment Controls (RECs) arranged in an aggregated manner. In IEEE 802.1CM, studies are underway to accommodate fronthaul traffic in a layer 2 (hereinafter referred to as L2) network (see, for example, Non Patent Literature 2). On the other hand, studies are underway to accommodate, in an access network, traffic that tolerates delay (delay tolerant traffic) represented by a part of the Internet of Things (IoT). In view of these, a study on a multi-service accommodation access network in which delay tolerant traffic is accommodated in the same L2 network (L2NW) in addition to fronthaul and backhaul has been reported (see, for example, Non Patent Literature 3).

In a service that flows through the L2NW, a large number of terminals may connect to an application server on the network simultaneously. The simultaneous connection may cause a connected server to be unable to process packets that arrive in a burst from the terminals. Since session request packets from the terminals are considered as an example of packets arriving in a burst, the case where the packets arriving in a burst are the session request packets is described as an example. Generally, as illustrated in FIG. 21, for each L2 switch (L2SW), the traffic to each destination is smoothed by shaping the flow through the L2SWs such that servers on the network do not accept a number of session request packets that exceed their processing capabilities.

CITATION LIST

Non Patent Literature

Non Patent Literature 1: "Docomo 5G White Paper", [online], September 2014, NTT Docomo, Inc. [Searched on Jun. 29, 2018], Internet <https://www.nttdocomo.co.jp/corporate/technology/whitepaper_5g/>

Non Patent Literature 2: Craig Gunther, "What's New in the World of IEEE 802.1 TSN", Standards News, IEEE Communications Magazine, Communications Standards Supplement, September 2016, p. 12-15

Non Patent Literature 3: Takahiro Kubo and 6 others, "Evaluation of Delay in L2 Network Accommodating Multi-services", the 2016 IEICE Communications Society Conference, September 2016, B-8-25, p. 155

SUMMARY OF THE INVENTION

Technical Problem

As illustrated in FIG. 22, when the processing capacity of the server is temporarily depleted, the threshold of the number of processible packets at the server decreases as compared to the normal situation illustrated in FIG. 21. Thus, even if the flow of session request packets to the server is at a normal rate, the server may discard the received packets more than before the depletion of the processing capacity. In such a situation, there is a problem in that the processing request packets cannot be distributed in the L2NW despite that discarding of the packets occurring because the packet processing cannot be executed in the server.

In light of the foregoing, an object of the present invention is to provide a network control device and a network control method that can distribute, in a relay network, processing request packets arriving in a burst to a communication device to be connected.

Means for Solving the Problem

One aspect of the present invention is a network control device including: a data collection unit configured to collect, from a relay device in a network system in which a packet is relayed between a first communication device and a second communication device via a relay network including one or more of the relay devices, uplink observation data indicating traffic volume of a processing request packet addressed to the second communication device from the first communication device and downlink observation data indicating traffic volume of a response packet transmitted from the second communication device in response to the processing request packet, the uplink observation data and the downlink observation data being acquired by observing the packet input to the relay device; and a control unit configured to change a shaping rate in the relay device included in the relay network, the shaping rate being a speed at which the packet addressed to the second communication device passes through the relay device, based on a ratio between the traffic volume indicated by the uplink observation data and the traffic volume indicated by the downlink observation data, or a ratio between an increment of the traffic volume acquired from the uplink observation data and an increment of the traffic volume acquired from the downlink observation data.

One aspect of the present invention is the above-described network control device, wherein the traffic volume is an input data rate, an input data amount, or the number of input packets to the relay device.

One aspect of the present invention is the above-described network control device, wherein the control unit is configured to detect an occurrence or an end of burst traffic of the processing request packet addressed to the second communication device, based on the ratio between the traffic volume indicated by the uplink observation data and the traffic volume indicated by the downlink observation data or the ratio between the increment of the traffic volume acquired from the uplink observation data and the increment of the traffic volume acquired from the downlink observation data, decrease the shaping rate when the occurrence is detected, and increase the shaping rate when the end is detected.

One aspect of the present invention is the above-described network control device, wherein the control unit is configured to detect the occurrence of burst traffic of the processing request packet addressed to the second communication device, based on a comparison of the traffic volume indicated by the uplink observation data and the traffic volume of the processing request packets that is processible in the second communication device, or based on a comparison of the increment of the traffic volume acquired from the uplink observation data and the increment of the traffic volume of the processing request packet that is processible in the second communication device.

One aspect of the present invention is the above-described network control device, wherein the control unit is configured to transmit, until receipt of a notification that the shaping rate is changeable, a shaping rate change request to each of the relay devices included in the relay network, in ascending order of distance from the second communication device.

One aspect of the present invention is the above-described network control device, wherein the relay network is a layer 2 network and the relay device is a layer 2 switch.

One aspect of the invention is the above-described network control device, wherein the processing request packet is a session request packet that requests start of a session, and the response packet is a session response packet that indicates a response to the session request packet.

One aspect of the present invention is a network control method including: collecting, from a relay device in a network system in which a packet is relayed between a first communication device and a second communication device via a relay network including one or more of the relay devices, uplink observation data indicating traffic volume of a processing request packet addressed to the second communication device from the first communication device and downlink observation data indicating traffic volume of a response packet transmitted from the second communication device in response to the processing request packet, the uplink observation data and the downlink observation data being acquired by observing the packet input to the relay device; and changing a shaping rate in the relay device included in the relay network, the shaping rate being a speed at which the packet addressed to the second communication device passes through the relay device, based on a ratio between the traffic volume indicated by the uplink observation data and the traffic volume indicated by the downlink observation data, or a ratio between an increment of the traffic volume acquired from the uplink observation data and an increment of the traffic volume acquired from the downlink observation data.

Effects of the Invention

According to the present invention, in a relay network, processing request packets arriving in a burst can be distributed to a communication device to be connected.

BRIEF DESCRIPTION OF DRAWINGS

FIG. 7 is a diagram illustrating uplink observation data according to the first embodiment.

FIG. 8 is a diagram illustrating downlink observation data according to the first embodiment.

FIG. 14 is a diagram illustrating uplink observation data at a previous cycle according to a second embodiment.

FIG. 15 is a diagram illustrating uplink increment data according to the second embodiment.

FIG. 16 is a diagram illustrating downlink observation data at the previous cycle according to the second embodiment.

FIG. 17 is a diagram illustrating downlink increment data according to the second embodiment.

FIG. 19 is a diagram illustrating processing capacity data according to a third embodiment.

DESCRIPTION OF EMBODIMENTS

Figure 1:
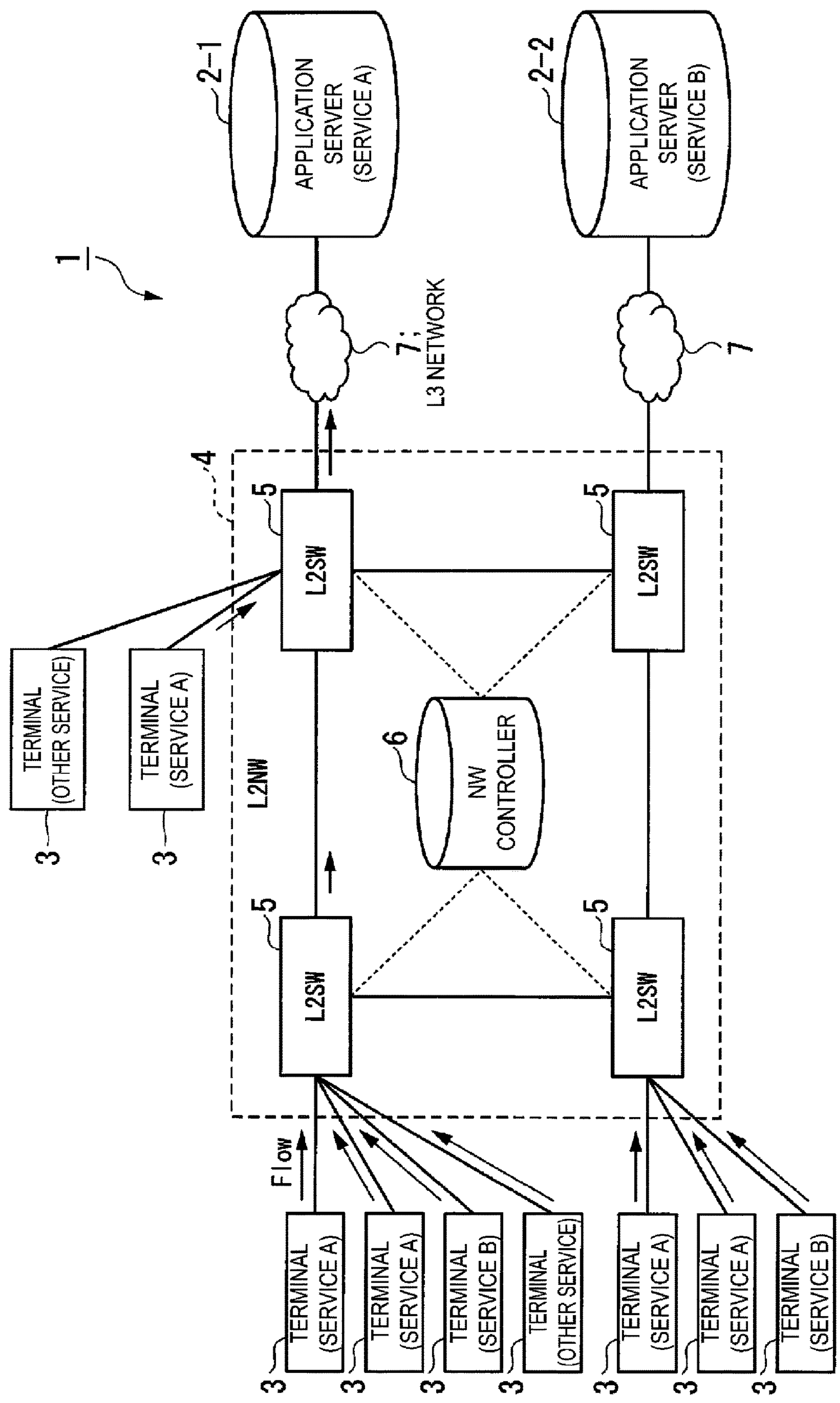
FIG. 1 is a diagram illustrating a configuration of a network system according to a first embodiment of the present invention.

Hereinafter, embodiments of the present invention will be described in detail with reference to the drawings. The embodiments relate to an L2 network technology. Specifically, the embodiments relate to the detection of a load on an application server connected to an L2NW that accommodates one or more services.

In the embodiments, a terminal communicates with the application server via the L2NW.

The L2NW includes an L2SW. A direction from the terminal to the application server is described as uplink, and a direction from the terminal to the application server is described as downlink. A network controller (NW controller) periodically collects, from the L2SW, traffic data of processing request packets addressed to the application server from the terminal and traffic data of response packets from the application server. The processing request packet is a packet that requests processing to the application server, and the response packet is transmitted as a response to the processing request packet. In the embodiments, the processing request packet is a session request packet that requests start of a session, and the response packet is a session response packet that indicates a response to the session request packet, as an example. The NW controller uses the collected traffic data to detect the depletion of the processing capacity of the application server or the occurrence of burst traffic. Specifically, the NW controller detects the depletion of the processing capacity or the occurrence of burst traffic based on a ratio of an input data rate, a ratio of an input data amount, a ratio of the number of input packets, or a ratio of an input data rate increment between the session request packet and the session response packet in the L2SW. Alternatively, the NW controller detects it based on the comparison of the input data rate, the input data amount, or the input data rate increment of the session request packet and a corresponding upper limit that is processible in the application server.

The NW controller sets the shaping rate to the L2SW that is as close as possible to the application server where the depletion of the processing capacity or the occurrence of burst traffic is detected among the L2SWs constituting the L2NW, so as to decrease the transmission rate of a flow (traffic flow) of all packets addressed to the application server or the session request packets. The shaping rate is a speed at which the input packets pass through the L2SW. This suppresses the session request packets arriving at the application server at the same time. Then, when determining that the depletion of the processing capacity of the application server has recovered or the occurrence of burst traffic has ended by using the collected traffic data, the NW controller increases the shaping rate to the original shaping rate.

In a related art, the congestion of packets is grasped in each L2SW, and the L2SW that grasps the congestion decreases the shaping rate in the own device. Thus, it may be difficult to control the flow of packets across the L2SW such that the traffic of the session request packets is a volume that is processible in the application server. According to the embodiments, the NW controller can grasp the state of the processing capacity for the session request packet in the application server or the occurrence of burst traffic without communicating directly with the application server, and change the shaping rate in the L2SW so as to decrease the flow of the session request packets across the L2NW. Accordingly, the arrival of the session request packets to the application server can be distributed, thereby preventing packet disposal in the application server and retransmission of delay tolerant traffic to improve the network utilization efficiency. Detailed embodiments will be described below.

First Embodiment

FIG. 1 is a diagram illustrating a configuration of a network system 1 according to a first embodiment of the present invention. The network system 1 includes application servers 2, terminals 3, an L2NW 4, and L3NWs (layer 3 networks) 7. When the network system 1 includes multiple application servers 2, the application servers 2 may provide different services. Among the J application servers 2 (J is an integer of 1 or more) included in the network system 1, the jth application server 2 (j is an integer of 1 or more and J or less) is also described as the application server 2-*j* or the application server #j. In this figure, the network system 1 includes two (J=2) application servers 2-1 and 2-2. The application server 2-1 provides a service A, and the application server 2-2 provides a service B. In addition, the multiple terminals 3 connected to the L2NW 4 include the terminals 3 that use service A, the terminals 3 that use the service B, and the terminals 3 that use the other services.

The application server 2 is connected to the terminal 3 via the L2NW 4 and the L3NW (layer 3 network) 7. The L2NW 4 is configured of one or more L2SWs 5. The nth (n is an integer of 1 or more and N or less) L2SW 5 among the N L2SWs 5 constituting the L2NW 4 is also described as L2SW #n. Note that the application server 2 and the terminal 3 may be directly connected to the L2NW 4 without passing through the L3 network. The L2NW 4 further includes an NW controller 6 (network control apparatus). The NW controller 6 is connected to each L2SW 5. The NW controller 6 may be integrated with the L2SW 5. For example, the NW controller 6 and the L2SW 5 may be housed in the same housing. When the NW controller 6 and the L2SW 5 are housed in the same housing and high-speed processing is required, a configuration is contemplated in which the NW controller 6 is implemented as hardware on each L2SW 5. The NW controller 6 may also be a device external to the L2NW 4. The L2NW 4 may be configured like an L2NW 4*a* illustrated in FIG. 2.

Figure 2:
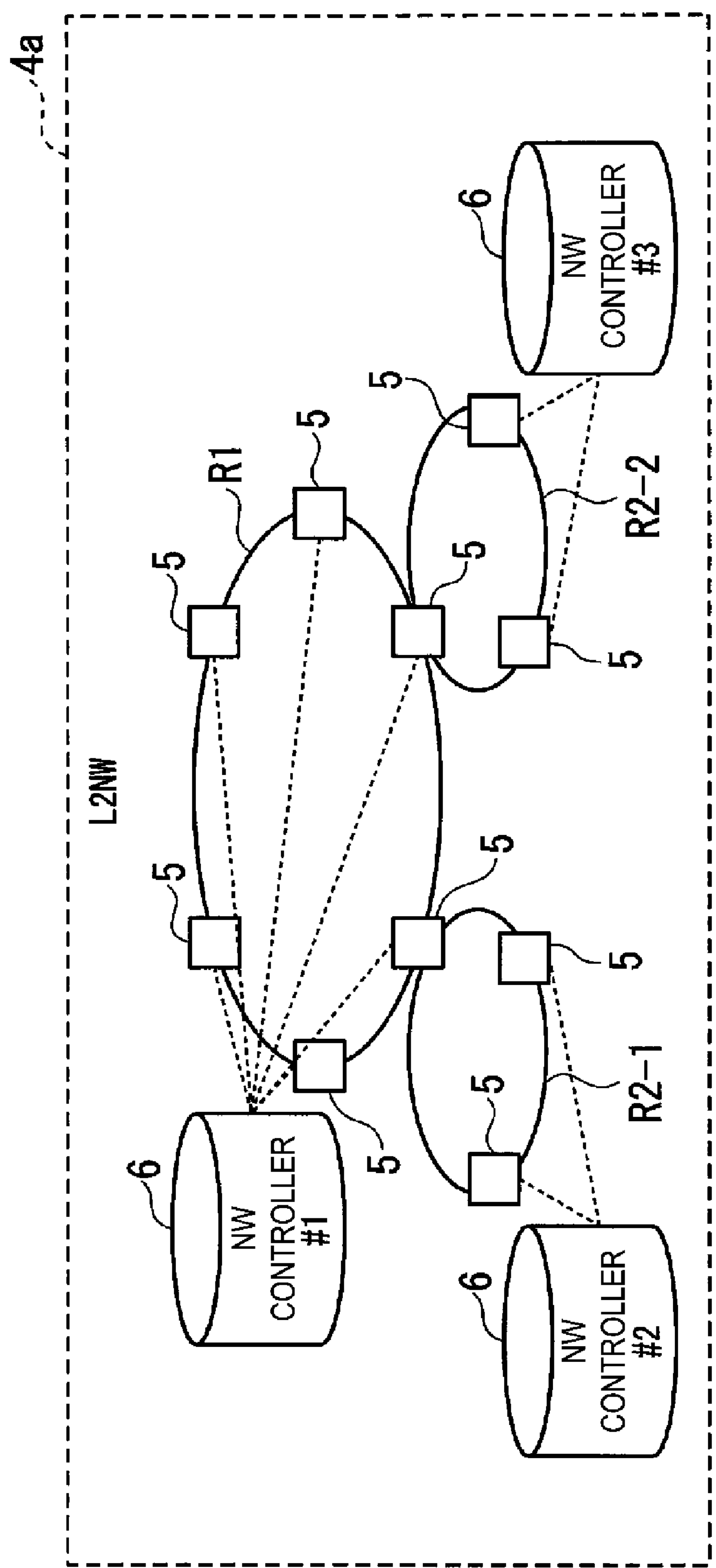
FIG. 2 is a diagram illustrating a configuration of an L2NW according to the first embodiment.

FIG. 2 is a diagram illustrating a configuration of the L2NW 4*a*. As illustrated in this figure, the L2NW 4*a* is a hierarchical structure constituted of a trunk ring R1 and branch rings R2-1, R2-2. The trunk ring R1 and the branch rings R2-1, R2-2 each include multiple L2SWs 5 connected to each other in a ring shape. The trunk ring R1 is connected to the branch ring R2-1 via one L2SW 5, and the trunk ring R1 is connected to the branch ring R2-2 via another L2SW 5. The L2SWs 5 constituting the trunk ring R1 are connected to an NW controller #1 that is a first NW controller 6, the L2SWs 5 constituting the branch ring R2-1 are connected to an NW controller #2 that is a second NW controller 6, and the L2SWs 5 constituting the branch ring R2-2 are connected to an NW controller #3 that is a third NW controller 6. In this manner, the multiple NW controllers 6 disposed for the trunk and branch lines may perform control.

Figure 3:
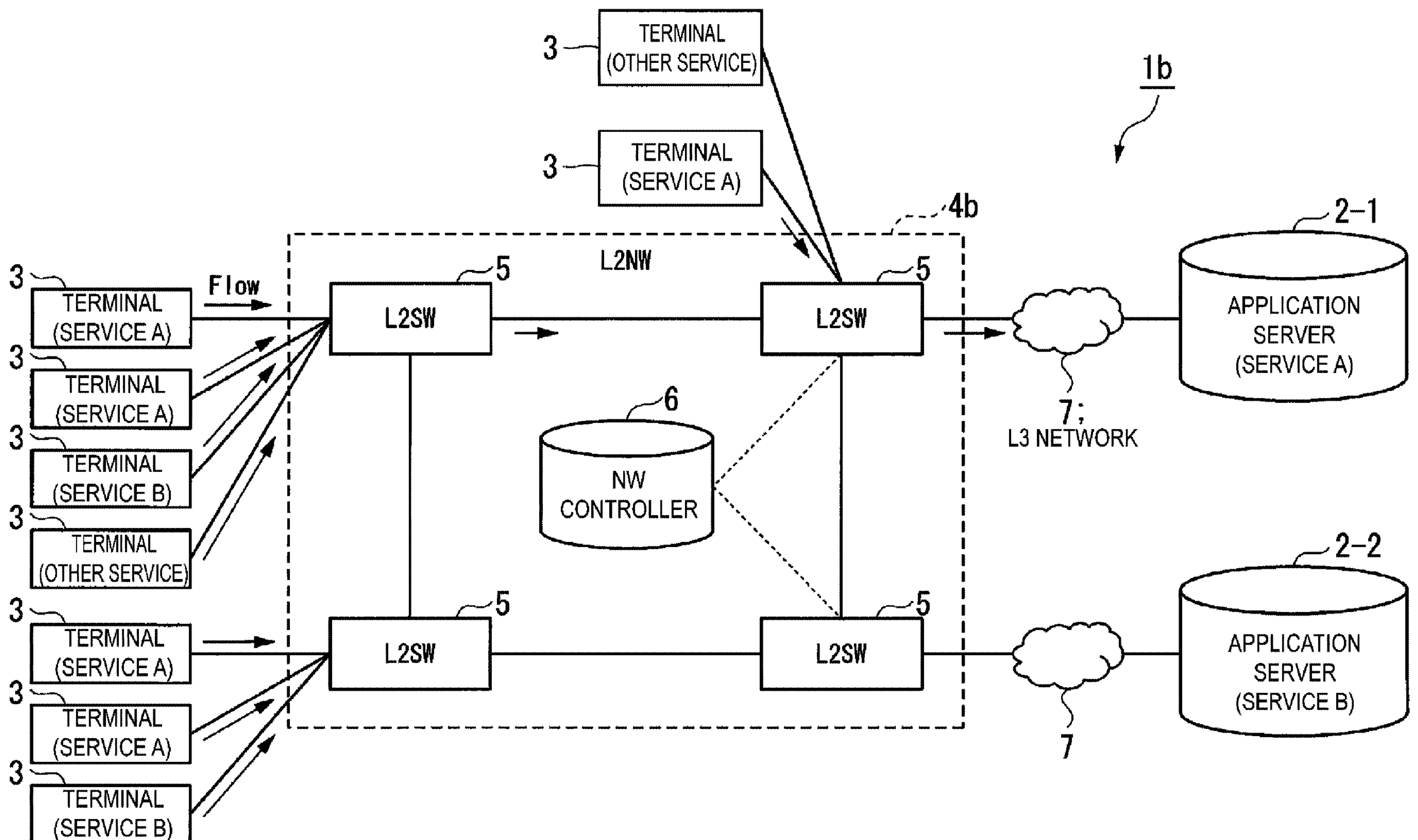
FIG. 3 is a diagram illustrating another configuration of the network system according to the first embodiment.

FIG. 3 is a diagram illustrating a configuration of a network system 1*b*. Instead of the network system 1 illustrated in FIG. 1, the network system 1*b* illustrated in this figure may be used. The network system 1*b* illustrated in FIG. 3 differs from the network system 1 illustrated in FIG. 1 in that an L2NW 4*b* is provided instead of the L2NW 4. The NW controller 6 is connected to some of the L2SWs 5 constituting the L2NW 4*b*. A related-art L2SW can be used as the L2SW 5 that is not connected to the NW controller 6. Such L2SW 5 that cannot communicate with and be controlled by the NW controller 6 may be provided.

Figure 4:
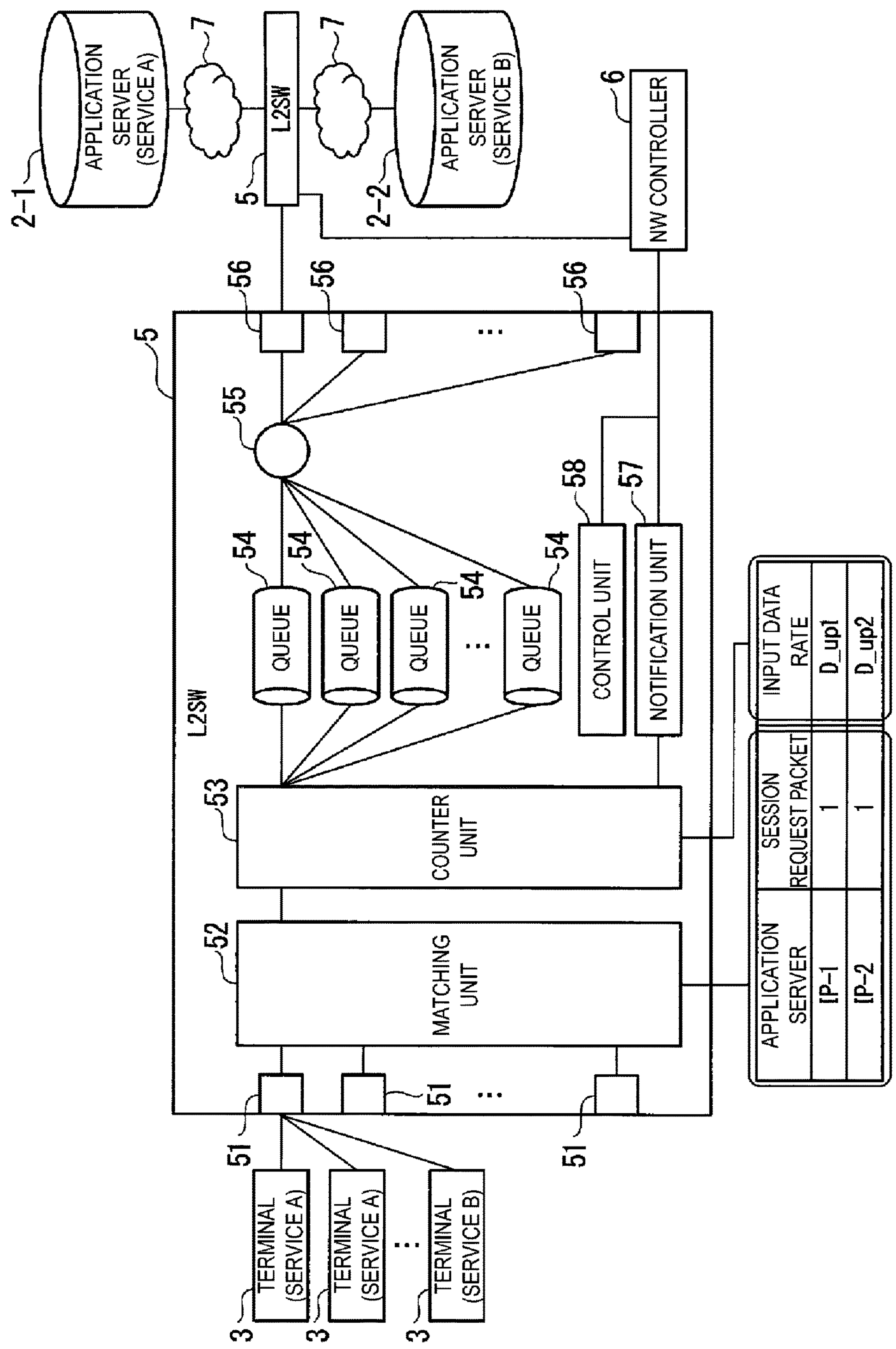
FIG. 4 is a block diagram illustrating an example of a configuration of an L2SW according to the first embodiment.

FIG. 4 is a block diagram illustrating an example of a configuration of the L2SW 5. The L2SW 5 includes first ports 51, a matching unit 52, a counter unit 53, queues 54, a shaper 55, second ports 56, a notification unit 57, and a control unit 58. The matching unit 52, the counter unit 53, the queues 54, and the shaper 55 are described only for an uplink packet.

The L2SW 5 includes one or more first ports 51. The first port 51 inputs an uplink packet from the terminal 3 or another downstream L2SW 5. The matching unit 52 classifies the input uplink packet. Specifically, the matching unit 52 refers to, for example, data of a header set to the packet to determine the destination and the type of the packet. The type of packet indicates whether the packet is a session request packet.

The counter unit 53 counts the number of bits of the packet for each classification of the packet by the matching unit 52. In this manner, the counter unit 53 measures traffic volume of the uplink packets at each observation cycle for each destination application server 2 and each packet type. The observation cycle is set to a time interval when a rising of burst traffic can be determined. The traffic volume is represented by an input data rate. The input data rate is a value acquired by dividing the number of bits of the packets input at one observation cycle by a time corresponding to one observation cycle. The counter unit 53 may further count an input data amount and the number of input packets as the traffic volume every observation cycle. The input data amount is the number of bits, the number of bytes, or the like of the input packets.

The L2SW 5 includes one or more queues 54. For example, the L2SW 5 may include multiple queues 54 with different priorities. The queue 54 temporarily stores (buffers) the uplink packet input from the first port 51. The queue 54 that stores the session request packet and the queue 54 that stores the data packet may be the same or different.

The shaper 55 reads the uplink packets stored in the queue 54 according to a set shaping rate, for example, according to the priority and outputs the uplink packets to the second port 56.

The L2SW 5 includes one or more second ports 56. The second port 56 outputs the uplink packet read from the queue 54 to another upstream L2SW 5 or the application server 2.

To transfer a downlink packet from the application server 2 to the terminal 3, the L2NW 4 includes a similarly-configured matching unit 52, counter unit 53, queue 54, and shaper 55 in the downlink direction (not illustrated). The downlink matching unit 52 (not illustrated) refers to, for example, data of a header set in a downlink packet received from the second port 56 to determine the source application server 2 and the type of the packet. The type of packet indicates whether or not the packet is a session response packet. The downlink counter unit 53 (not illustrated) measures the traffic volume of the downlink packet for each source application server 2 matched by the downlink matching unit 52 and each type of the packet. The downlink queue 54 (not illustrated) temporarily stores the downlink packet. The downlink shaper 55 (not illustrated) reads the downlink packet stored in the downlink queue 54 (not illustrated) according to priority, and outputs the read downlink packet to a downstream L2SW 5 or the terminal 3 via the first port 51.

The notification unit 57 periodically notifies the NW controller 6 of observation data with a value of uplink packet observation data and a value of downlink packet observation data, which will be described below. The uplink packet observation data indicates the traffic volume of the uplink packets for each destination application server 2 and packet type observed in one observation cycle. The downlink packet observation data indicates the traffic volume of the downlink packets for each source application server 2 and packet type observed in one observation cycle.

The control unit 58 controls each of the function unit. The control unit 58 controls shaping in the shaper 55.

Figures 5, 6:
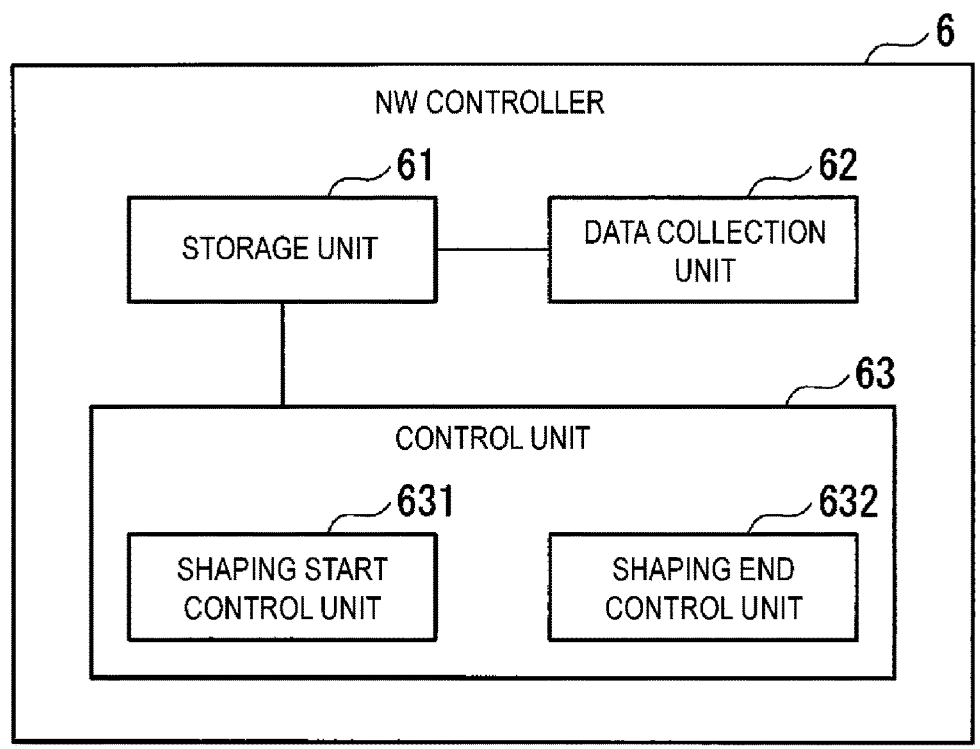
FIG. 5 is a block diagram illustrating a configuration of an NW controller according to the first embodiment.
FIG. 6 is a diagram illustrating hop number data according to the first embodiment.

FIG. 5 is a block diagram illustrating a configuration of the NW controller 6. The NW controller 6 includes a storage unit 61, a data collection unit 62, and a control unit 63. The storage unit 61 stores hop number data and observation data in each L2SW 5. The hop number data indicates the number of hops between each application server 2 and each L2SW 5. The data collection unit 62 periodically collects the observation data from each L2SW 5, and stores the observation data in the storage unit 61.

The control unit 63 includes a shaping start control unit 631 and a shaping end control unit 632. The shaping start control unit 631 refers to the observation data, and calculates a ratio between the input data rate of the session request packets and the input data rate of the session response packets for each application server 2. Based on the calculated ratio, the shaping start control unit 631 detects temporary depletion of the processing capacity of the application server 2 or the occurrence of burst traffic addressed to the application server 2. The shaping start control unit 631 instructs the L2SW 5 to change the shaping rate so as to reduce the traffic volume of the uplink packets addressed to the detected application server 2. At this time, the shaping start control unit 631 refers to the hop number data, and preferentially instructs the L2SW 5 having a small number of hops between the L2SW 5 and the application server 2.

The shaping end control unit 632 refers to the observation data, and calculates a ratio between the input data rate of the session request packets and the input data rate of the session response packets for each application server 2. Based on the calculated ratio, the shaping end control unit 632 detects the recovery from temporary depletion of the processing capacity of the application server 2 or the end of burst traffic addressed to the application server 2. The shaping end control unit 632 instructs the L2SW 5 to change the shaping rate so as to increase the traffic volume of the uplink packets addressed to the detected application server 2.

FIG. 6 is a diagram illustrating an example of the hop number data. The hop number data indicates identification information of the application server 2 and the number of hops from the application server 2 to each L2SW. An Internet Protocol (IP) address of the application server 2 can be used as the identification information of the application server 2.

FIG. 7 is a diagram illustrating an example of uplink observation data. The uplink observation data illustrated in this figure indicates the input data rate and the input data amount of the uplink packets observed (measured) by the L2SW 5 at one observation cycle for each identification information of the application server 2 and each packet type. The packet type is represented by whether or not the packet is the session request packet. The packet type is set to "1" when the packet is the session request packet, and to "0" when the packet is a packet other than the session request packet.

FIG. 8 is a diagram illustrating an example of downlink observation data. The downlink observation data illustrated in this figure indicates the input data rate and the input data amount of the downlink packets observed (measured) by the L2SW 5 at one observation cycle for identification information of each application server 2 and each packet type. The packet type is represented by whether or not the packet is the session response packet. The packet type is set to "1" when the packet is the session response packet, and to "0" when the packet is a packet other than the session response packet.

Figure 9:
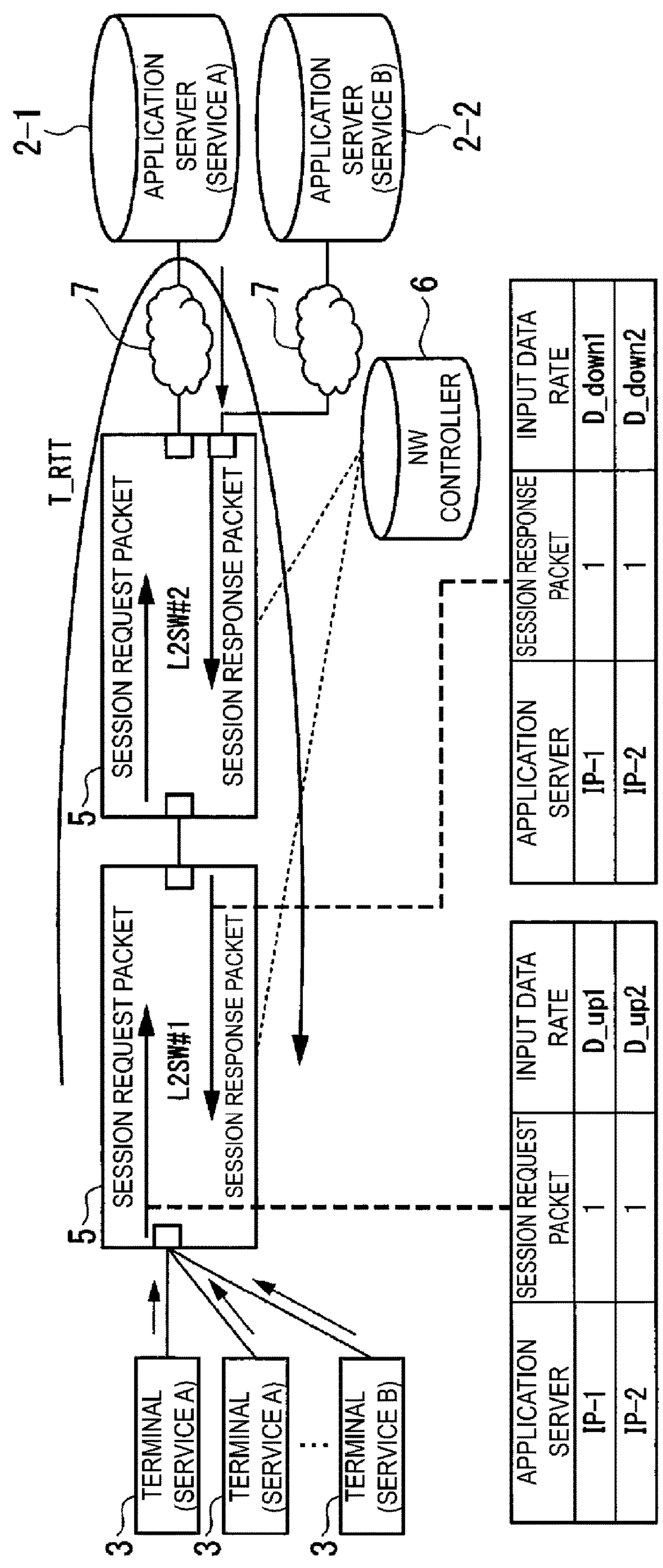
FIG. 9 is a diagram illustrating flows of session request packets and session response packets in the L2NW according to the first embodiment.

FIG. 9 is a diagram illustrating flows of the session request packets and the session response packets in the L2NW 4. As illustrated in this figure, the L2SW 5 receives the session response packet from the application server 2 for the relayed session request packet after an elapse of T_RTT. The T_RTT corresponds to a total time of a round-trip propagation delay from the L2SW 5 to the application server 2, a processing delay in the L2SW 5, and a processing delay in the application server 2.

Figure 10:
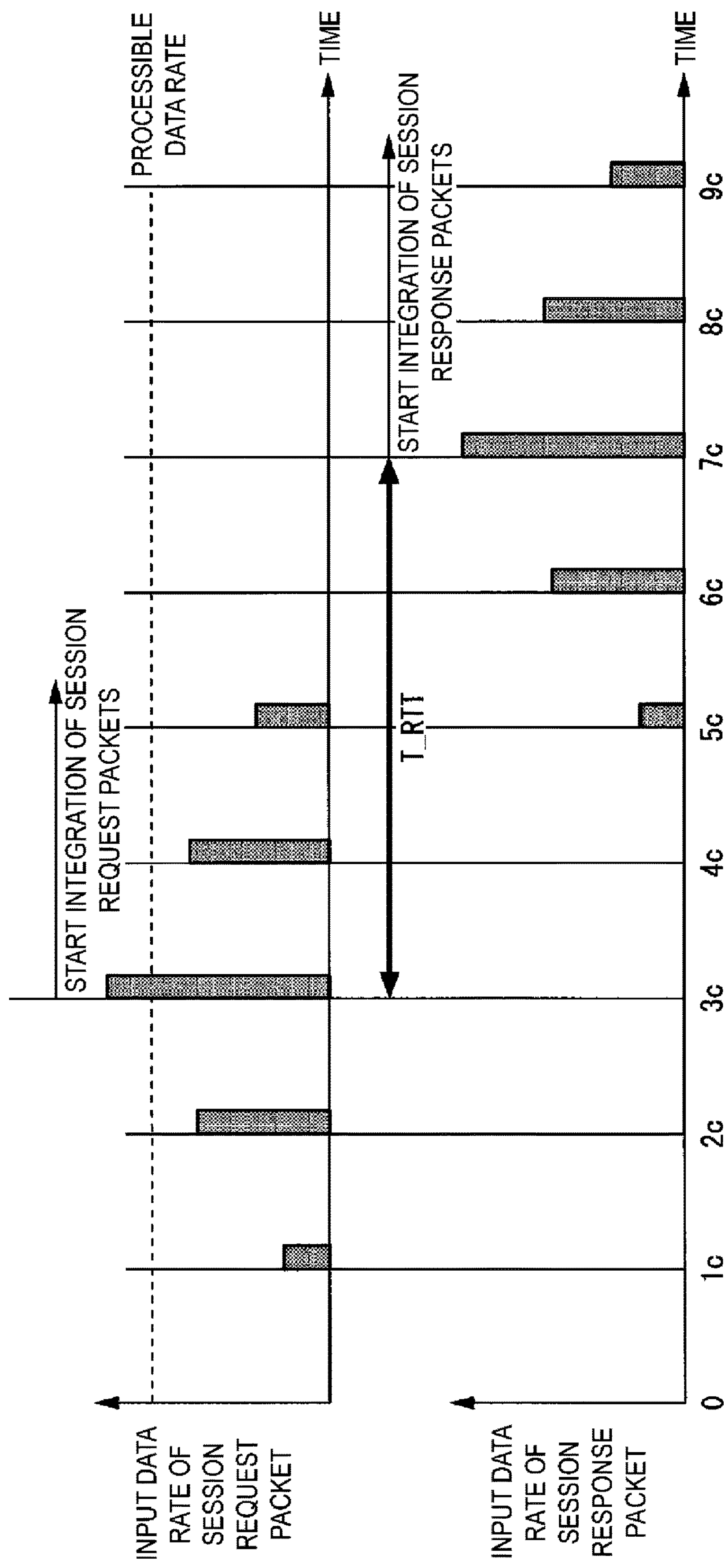
FIG. 10 is a diagram illustrating timing of an input data rate of the session response packets used in comparing with an input data rate of the session request packets according to the first embodiment.

FIG. 10 is a diagram illustrating timing of the input data rate of the session response packets used in comparing with the input data rate of the session request packets. In this figure, the input data rate of the session request packets is acquired in discrete times 1c to 5c with the observation cycle as a unit. After an elapse of the certain time T_RTT, the input data rate of the session response packets undergoes a similar change to a change in the input data rate of the session request packets. Thus, the control unit 63 of the NW controller 6 compares the input data rate of the session request packets with the input data rate of the session response packets with the timing shifted backward by T_RTT.

In the example illustrated in this figure, T_RTT is 4c. The control unit 63 of the NW controller 6 compares the input data rate of the session response packets at the discrete time 3c with the input data rate of the session request packets at a discrete time 7c (=3c+4c).

Figure 11:
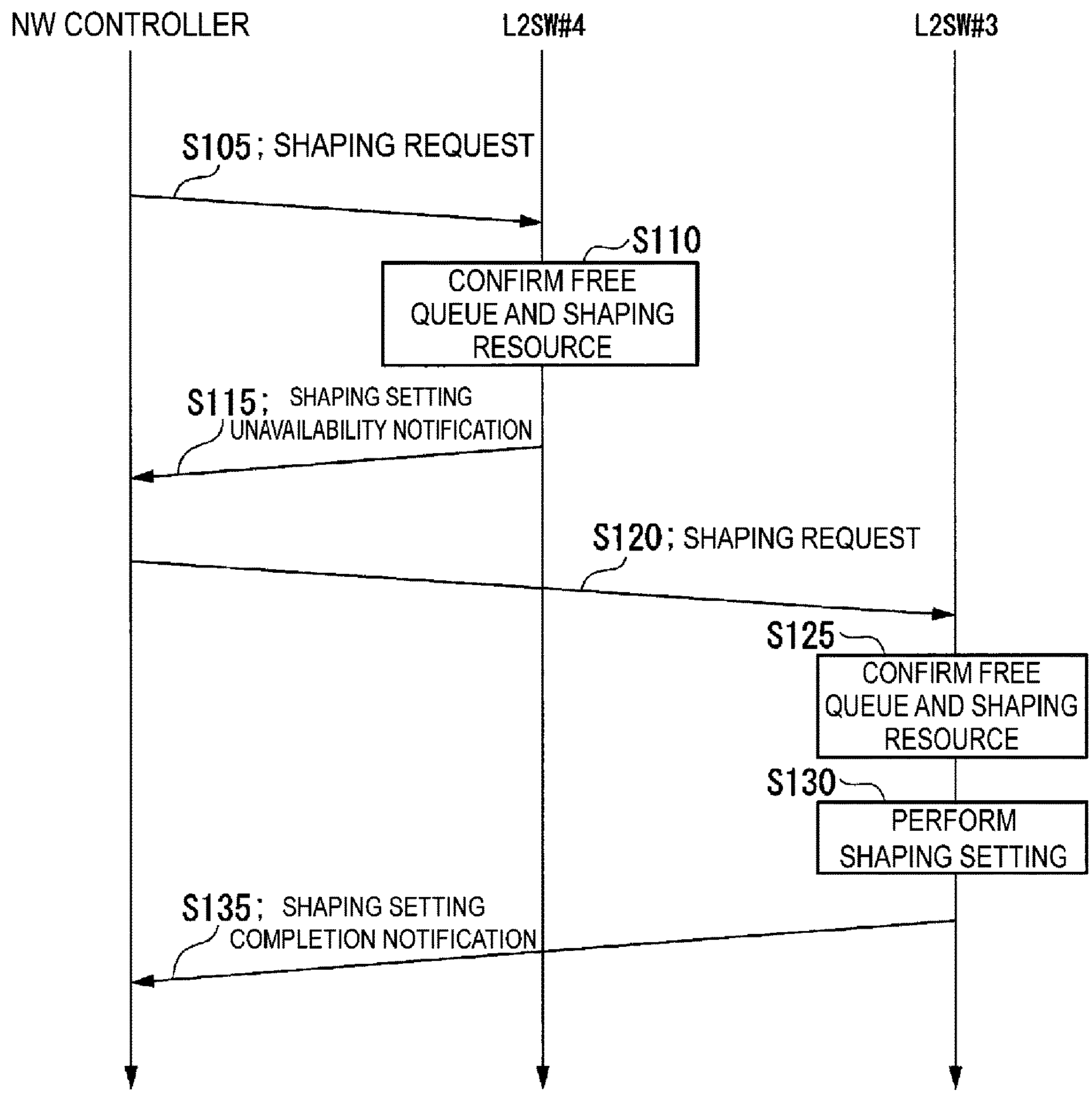
FIG. 11 is a sequence diagram in which the NW controller performs shaping setting on the L2SW according to the first embodiment.

FIG. 11 is a sequence diagram in which the NW controller 6 performs a shaping setting on the L2SW 5. Here, it is assumed that among the L2SWs 5 that constitute the L2NW 4 and can be controlled by the NW controller 6, the L2SW #4 is closest and the L2SW #3 is second closest to the application server 2 where the temporary depletion of the processing capacity or burst traffic has occurred.

First, the shaping start control unit 631 of the NW controller 6 transmits a shaping request to the L2SW #4 (step S105). When receiving the shaping request, the L2SW #4 confirms its free queue and shaping resource (step S110). When determining that shaping is unavailable as a result of the confirmation, the L2SW #4 transmits a shaping unavailability notification to the NW controller 6 (step S115).

When receiving the shaping unavailability notification from the L2SW #4, the shaping start control unit 631 of the NW controller 6 transmits a shaping request to the L2SW #3 (step S120). When receiving the shaping request from the NW controller 6, the L2SW #3 confirms its free queue and shaping resource (step S125).

When determining that shaping is available as a result of the confirmation, the L2SW #3 performs shaping setting (step S130) and transmits a shaping setting completion notification to the NW controller 6 (step S135).

Figure 12:
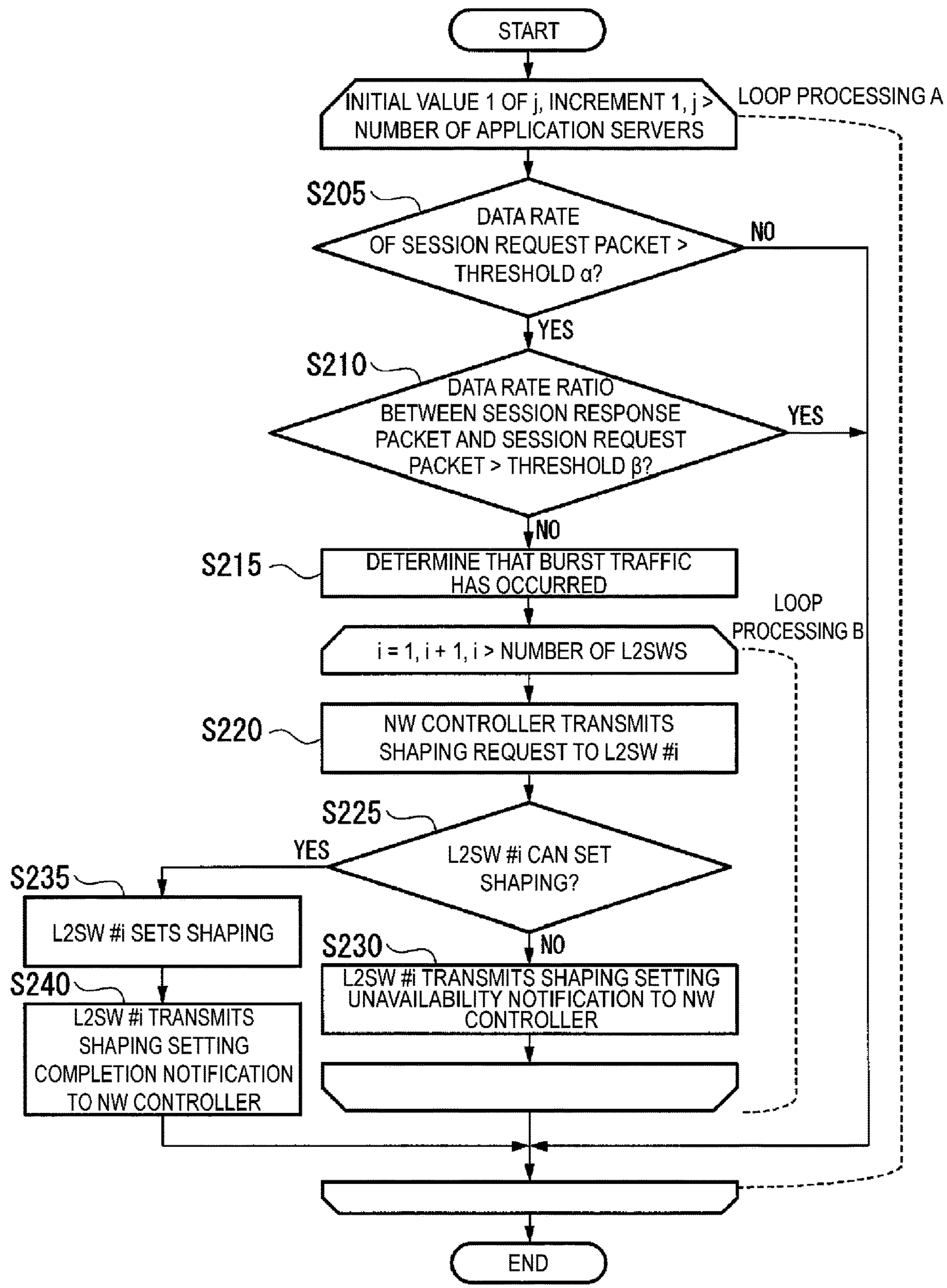
FIG. 12 is a flow chart illustrating shaping start processing of the network system according to the first embodiment.

FIG. 12 is a flow chart illustrating shaping start processing of the network system 1. This figure illustrates the flow from the detection of temporary depletion of the processing capacity in the application server 2 or burst traffic to the shaping setting change. The data collection unit 62 of the NW controller 6 receives observation data periodically acquired every observation cycle from each L2SW 5, and registers the observation data with the storage unit 61. The network system 1 executes the processing illustrated in this figure every processing cycle having the same length as the observation cycle.

First, the shaping start control unit 631 of the NW controller 6 initializes a variable j to 1. The shaping start control unit 631 executes loop processing A in below-mentioned steps S205 to S240 for the application server #j, which is the jth application server 2.

First, the shaping start control unit 631 acquires the input data rate of the session request packets of the application server #j from the uplink observation data of the latest observation cycle. The shaping start control unit 631 determines whether the acquired input data rate is larger than a threshold α (step S205). For example, the shaping start control unit 631 may make a determination on the input data rate acquired from each piece of the uplink observation data of all or some L2SWs 5 constituting the L2NW 4, and may make a determination on the total of the input data rates acquired from the uplink observation data of all or multiple L2SWs 5. For example, the shaping start control unit 631 may acquire the total of the input data rates to the application server #j based on the uplink observation data of one or more L2SWs 5, and use the total input data rate for the determination. As an example, the shaping start control unit 631 uses the input data rate acquired from the total uplink observation data of the L2SW 5 that is separated from the application server #j by one hop. Note that, in the case where the determination is made using the input data rate of each L2NW 4, the threshold a may be a different value according to the number of hops between the application server 2 and the L2SW 5 generating uplink observation data that is a source of the input data rate, or the number of the downstream L2SWs 5 and terminals 3.

When determining that the input data rate of the session request packets of the application server #j is the threshold α or less (NO in step S205), the shaping start control unit 631 adds 1 to the value of the variable j, and executes the processing again from the step S205. On the contrary, when determining that the input data rate of the session request packets of the application server #j is larger than the threshold a (YES in step S205), the shaping start control unit 631 executes the processing in the step S210. Note that in determining each input data rate of the L2NW 4, the shaping start control unit 631 determines NO in the step S205 when all of the input data rates are the threshold α or less, and determines YES in the step S205 when any of the input data rates exceed the threshold a.

The shaping start control unit 631 acquires the input data rate of the session response packets from the application server #j from the downlink observation data in the latest observation cycle. Further, the shaping start control unit 631 acquires the input data rate of the session request packets addressed to the application server #j from the uplink observation data at the observation cycle going back from the latest observation cycle by T_RTT. The shaping start control unit 631 calculates a ratio of an input data rate that is a ratio between the input data rate of the session response packets and the input data rate of the session request packets, and determines whether the ratio is larger than a threshold β described later (step S210). The threshold β is a value that is sufficiently smaller than (separated from) the input data rate ratio when the application server 2 normally transmits the session response packet in response to the session request packet.

At this time, the shaping start control unit 631 may make a determination on the input data rate ratio calculated for each of all or some of the L2SWs 5 constituting the L2NW 4, and may make a determination on the input data rate ratio calculated collectively for all or multiple L2SWs 5. For example, the shaping start control unit 631 may calculate the ratio of the input data rates to the application server #j in the entire L2NW 4 based on the observation data of one or more L2SWs 5, and use the ratio of the input data rates for the determination. As an example, the shaping start control unit 631 uses the input data rate ratio acquired from the total of the observation data of the L2SW 5 that is separated from the application server #j by one hop. In determining each input data rate ratio calculated for each of the L2SWs 5, the shaping start control unit 631 determines YES in the step S210 when the input data rate ratio of all of the L2SWs 5 is larger than the threshold β, and determines NO in the step S210 when the input data rate ratio of any of the L2SWs 5 is the threshold β or less. Note that the threshold β may be a different value according to the number of hops between the application server 2 and the L2SW 5 for which the input data rate ratio is acquired, or the number of downstream L2SWs 5 or terminals 3.

When determining that the input data rate ratio is larger than the threshold β (YES in step S210), the shaping start control unit 631 adds 1 to the value of the variable j, and executes the processing again from the step S205. On the contrary, when determining that the input data rate ratio is the threshold β or less (NO in step S210), the shaping start control unit 631 determines that the session response packet has not normally transmitted to the session request packet transmitted to the application server #j, and temporary depletion of the processing capacity or burst traffic has occurred in the application server #j (step S215). The time when the temporary depletion of the processing capacity or burst traffic is supposed to have occurred is an observation cycle that goes back from the latest observation cycle by T_RTT.

The shaping start control unit 631 refers to the hop number data illustrated in FIG. 6 and assigns a number i to the L2SWs 5 that can be controlled from the NW controller 6 in decreasing order of the number of hops from the application server #j. The shaping start control unit 631 initializes the variable i to 1 and executes loop processing B in the steps S220 to S230.

The shaping start control unit 631 transmits a shaping request notification to the L2SW 5 that is the ith L2SW #i (step S220). For example, a shaping target may be the session request packet addressed to application server #j, or may be all packets addressed to application server #j. Also, the shaping request notification may indicate a shaping rate such that the shaped data rate becomes the pre-acquired data rate that is processible for the application server #j. The processible data rate in the application server #j may be common to all L2SWs 5, or may be determined for each L2SW 5. In the case where the processible data rate is determined for each L2SW 5, the processible data rate may be determined according to the number of hops from the application server 2 to the L2SW 5, or the number of L2NWs 4 or the terminals 3 subordinate to the L2SW 5.

When receiving the shaping request notification, the control unit 58 of the L2SW #i determines whether the setting of shaping is possible (step S225). When determining that the setting of shaping is unavailable (NO in step S225), the control unit 58 of L2SW #i returns the shaping unavailability notification to the NW controller 6 (step S230). When receiving the shaping unavailability notification, the shaping start control unit 631 adds 1 to the current value of i, and repeats the loop processing B from the step S220.

When determining that the setting of shaping is available (YES in step S225), the control unit 58 of the L2SW #i controls the shaper 55 to perform shaping (step S235). The control unit 58 of L2SW #i returns the shaping setting completion notification to the NW controller 6 (step S240).

The shaping start control unit 631 of the NW controller 6 receives the shaping setting completion notification from the L2SW #i to terminate the loop processing B, or executes the loop processing B at the time when the value of the variable i is the number of L2SWs 5 (or the number of L2SWs 5 that can be controlled by the NW controller 6), and then, adds 1 to the current value of the variable j and repeats the loop processing A. The shaping start control unit 631 executes the processing A at the time when the value of the variable j is the number of application servers 2 and then, terminates the processing in FIG. 12.

Note that in the step S210 described above, the shaping start control unit 631 determines the occurrence of burst traffic using the ratio between the input data rate of the session response packets and the input data rate of the session request packets, but the input data amount or the number of input packets can be used instead of the input data rate. In the step S210, the shaping start control unit 631 acquires, from the observation data, an input data amount of the session response packets and an input data amount of the session request packets, and compares the ratio between the input data amounts with a threshold.

Alternatively, the shaping start control unit 631 acquires, from the observation data, the number of input session response packets and the number of input session request packets, and compares the number of input packets with a threshold. Note that, when the number of input packets is used, the notification unit 57 sets the number of input packets for each destination application server 2 and each packet type to the uplink observation data in each observation cycle, and sets the number of input packets for each source application server 2 and each packet type to the downlink observation data in each observation cycle.

Next, control to end the shaping set in the step S235 described above will be described. The shaping end control unit 632 of the NW controller 6 refers to the observation data generated by the L2SW 5, and acquires, from the time when temporary depletion of the processing capacity or burst traffic in the application server #j (j=1, 2, . . . ) is estimated to have occurred, an integrated value of the input data rates of the session request packets addressed to the application server #j and an integrated value of the input data rates of the session response packets from the application server #j. The shaping end control unit 632 estimates the end of the burst traffic based on the comparison of these integrated values. When estimating that the burst traffic has ended based on the observation data, the shaping end control unit 632 requests the L2SW 5 to terminate the shaping of the uplink packets addressed to the application server #j.

Note that as illustrated in FIGS. 9 and 10, a certain time T_RTT is required until the session request packet arrives at the application server #j through the L2SW #i, is processed, and returned to the same L2SW #i switch as the session response packet. Thus, the shaping end control unit 632 sets an integration start timing of the session response packets to a time elapsed from an integration start timing of the session request packets by T_RTT. In FIG. 10, since T_RTT is 4c, when the integration start timing of the session request packets is the discrete time 3c, the integration start timing of the session request packets is the discrete time 7c (=3c+4c).

Figure 13:
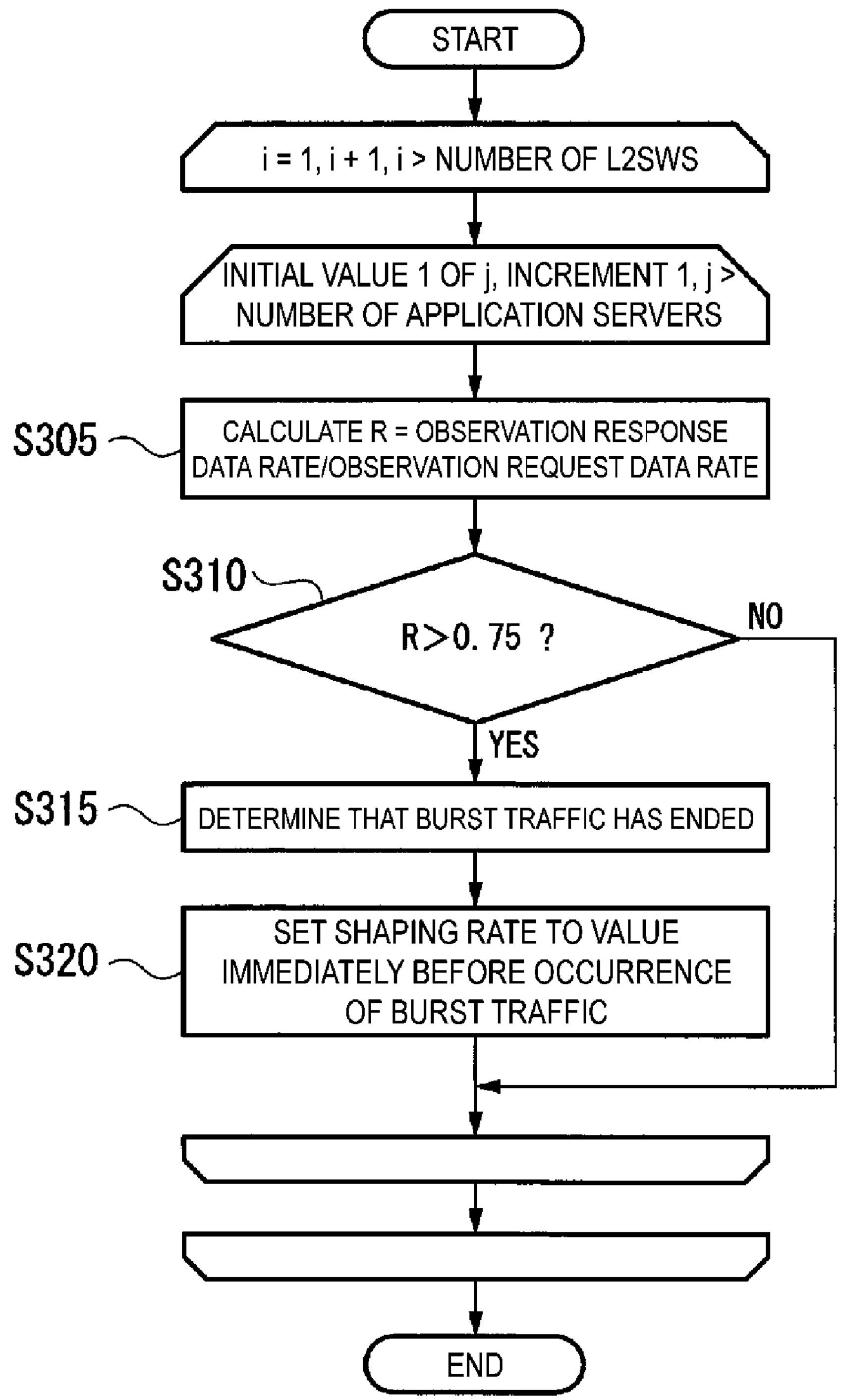
FIG. 13 is a flow chart illustrating shaping end processing of the network system according to the first embodiment.

FIG. 13 is a flow chart of shaping end processing of the network system 1 at each observation cycle. This figure illustrates a flow from the detection of the end of burst traffic to the cancellation of the setting of the shaping rate set to the L2SW 5. The network system 1 executes the processing illustrated in this figure at each processing cycle having the same length of the observation cycle.

The shaping end control unit 632 of the NW controller 6 initializes the variable i to 1. Further, the shaping end control unit 632 initializes the value of the variable j to 1. The shaping end control unit 632 calculates an observation request data rate and an observation response data rate of the application server #j in the L2SW #i, which is the ith L2SW 5, from the observation data stored in the storage unit 61. The observation request data rate is the integrated value of the input data rate of the session request packets addressed to the application server #j, which is observed in the L2SW #i from a time when temporary depletion of the processing capacity or burst traffic is estimated to have occurred. The observation response data rate is the integrated value of the input data rate of the session response packets from the application server #j, which is observed in the L2SW #i from a time elapsed from the time when temporary depletion of the processing capacity or burst traffic is estimated to have occurred by T_RTT. The shaping end control unit 632 calculates a rate R by dividing the observation response data rate by the observation request data rate (step S305).

The shaping end control unit 632 determines whether the calculated rate R is larger than a threshold TR (step S310). When the session request packet and the session response packet have the same packet size, a value that is sufficiently close to and smaller than 1, for example, 0.75 is used as the threshold TR. When the session request packet and the session response packet have different packet size ratios, the threshold TR is changed according to a size ratio. For example, when the size ratio between the session request packet and the session response packet is 10:9, the two types of packets have the same input rate at R=0.9. In this case, the threshold TR is set to a value that is sufficiently close to 0.9 and less than 0.9.

When determining that the rate R is the threshold TR or less (NO in step S310), the shaping end control unit 632 adds 1 to the value of j and repeats the processing from the step S305. When determining that the rate R exceeds the threshold TR (YES in step S305), the shaping end control unit 632 determines that temporary depletion of the processing capacity or burst traffic in the application server #j has ended (step S315). The shaping end control unit 632 transmits the shaping rate change instruction for setting the shaping rate before the occurrence of temporary depletion of the processing capacity or burst traffic to all of the L2SWs 5 or to the L2SW #i (step S320). The control unit 58 of the L2SW 5 that receives the shaping rate change instruction sets a change in the shaping rate to the shaper 55. The shaping end control unit 632 adds 1 to the value of j and repeats the processing from the step S305. Note that the shaping rate may be gradually increased and returned to the original state.

Upon completion of the processing from the step S305 to the step S320 at the time when the value of the variable i is the number of the L2SWs 5 that can be controlled by the NW controller 6, the shaping end control unit 632 adds 1 to the current value of the variable j and increases the variable i from an initial value by one and repeats the processes in the step S305 to the step S320 for each value of i. When the value of the variable j reaches the number of the application servers 2, the shaping start control unit 631 terminates the processing.

Note that, the processing in the step S305 and the step S310 may be performed using the input data amount or the number of input packets instead of the input data rate. When using the input data amount, instead of the rate R described above, a following index R' is compared with a threshold.

R'=integrated value of session response packet data amount/integrated value of session request packet data amount The above-mentioned integration value of the session request packet data amount is an integrated value of the input data amount of the session request packets after a time when temporary depletion of the processing capacity or burst traffic is estimated to have occurred. Additionally, the integrated value of the session response packet data amount is an integrated value of the input data amount of the session response packets after T_RTT has elapsed since the estimated time.

In addition, when using the number of input packets, instead of the rate R described above, a following index R" is compared with a threshold.

R"=integrated value of the number of session response packets/integrated value of the number of session request packets The above-mentioned integration value of the number of session request packets is an integrated value of the number of input session request packets after a time when temporary depletion of the processing capacity or burst traffic is estimated to have occurred. In addition, the integrated value of the number of input session response packets is an integrated value of the number of session response packets after T_RTT has elapsed since the estimated time.

According to this embodiment, the occurrence of temporary depletion of the processing capacity or burst traffic in the application server 2 can be detected to reduce traffic of the session response packets in the entire L2NW 4. In addition, it is possible to detect that the processing capacity of the application server 2 has been restored or that the occurrence of burst traffic has ended without inquiring the application server 2, to terminate the shaping performed in the L2SW 5.

Second Embodiment

In the first embodiment, it is determined whether or not burst traffic or temporary depletion of the processing capacity of the application server 2 has occurred, based on the ratio of the input data rate, the ratio of the input data amount, or the ratio of the number of input packets between the session response packets and the session request packets in the L2SW 5. In the present embodiment, instead of the input data rate, the input data amount, or the number of input packets in the first embodiment, an increment of the input data rate, an increment of the input data amount, and an increment of the number of input packets from the past observation cycle. Hereinafter, using the increment of the input data rate as an example, differences from the first embodiment will be mainly described.

A network system in the present embodiment is similar to the network system 1 in the first embodiment illustrated in FIG. 1. Also, configurations of the L2SW 5 and NW controller 6 in the present embodiment are similar to the configuration of the L2SW 5 and NW controller 6 illustrated in FIG. 4.

As in the first embodiment, the data collection unit 62 of the NW controller 6 periodically receives the observation data including the uplink observation data illustrated in FIG. 7 and the downlink observation data illustrated in FIG. 8 every observation cycle from each L2NW 4, and writes the observation data into the storage unit 61. Further, the data collection unit 62 uses the collected observation data and observation data at the previous observation cycle to calculate increments of the uplink packets and the downlink packets for each application server 2 in each L2NW 4 and each packet type, and registers the input data rate increments with the storage unit 61.

FIG. 14 is a diagram illustrating an example of uplink observation data at the previous cycle. Similar to the uplink observation data illustrated in FIG. 7, the uplink observation data in the previous uplink observation data is acquired from the uplink observation data at the previous observation cycle in the same L2NW 4. The uplink observation data at the previous cycle in this figure indicates the previous input data rate and the previous input data amount of the uplink packets for which the L2SW 5 observed (measured) for identification information of each application server 2 and each packet type. The previous input data rate is the input data rate of the uplink packets at the previous observation cycle, and the previous input data amount is the input data amount at the previous observation cycle. The packet type is represented by whether or not the packet is the session request packet.

FIG. 15 is a diagram illustrating an example of uplink increment data. The uplink increment data indicates an increment of the input data rate of the uplink packets for each application server 2 and each packet type. The increment of the input data rate is acquired by subtracting the previous input data rate indicated by the previous uplink observation data illustrated in FIG. 14 from the input data rate indicated by the uplink observation data illustrated in FIG. 7.

FIG. 16 is a diagram illustrating an example of downlink observation data at the previous cycle. Similar to the downlink observation data illustrated in FIG. 8, the downlink observation data in the previous downlink observation data is acquired from the downlink observation data at the previous observation cycle in the same L2NW 4. The downlink observation data at the previous cycle in this figure indicates the previous input data rate of the downlink packets for which the L2SW 5 observed (measured) for identification information of each application server 2 and each packet type. The previous input data rate is the input data rate of the downlink packets at the previous observation cycle. The packet type is represented by whether or not the packet is the session response packet.

FIG. 17 is a diagram illustrating an example of downlink increment data. The downlink increment data indicates an increment of the input data rate of the downlink packets for each application server 2 and each packet type. The increment of the input data rate is acquired by subtracting the previous input data rate indicated by the previous downlink observation data illustrated in FIG. 16 from the input data rate indicated by the downlink observation data illustrated in FIG. 8.

Figure 18:
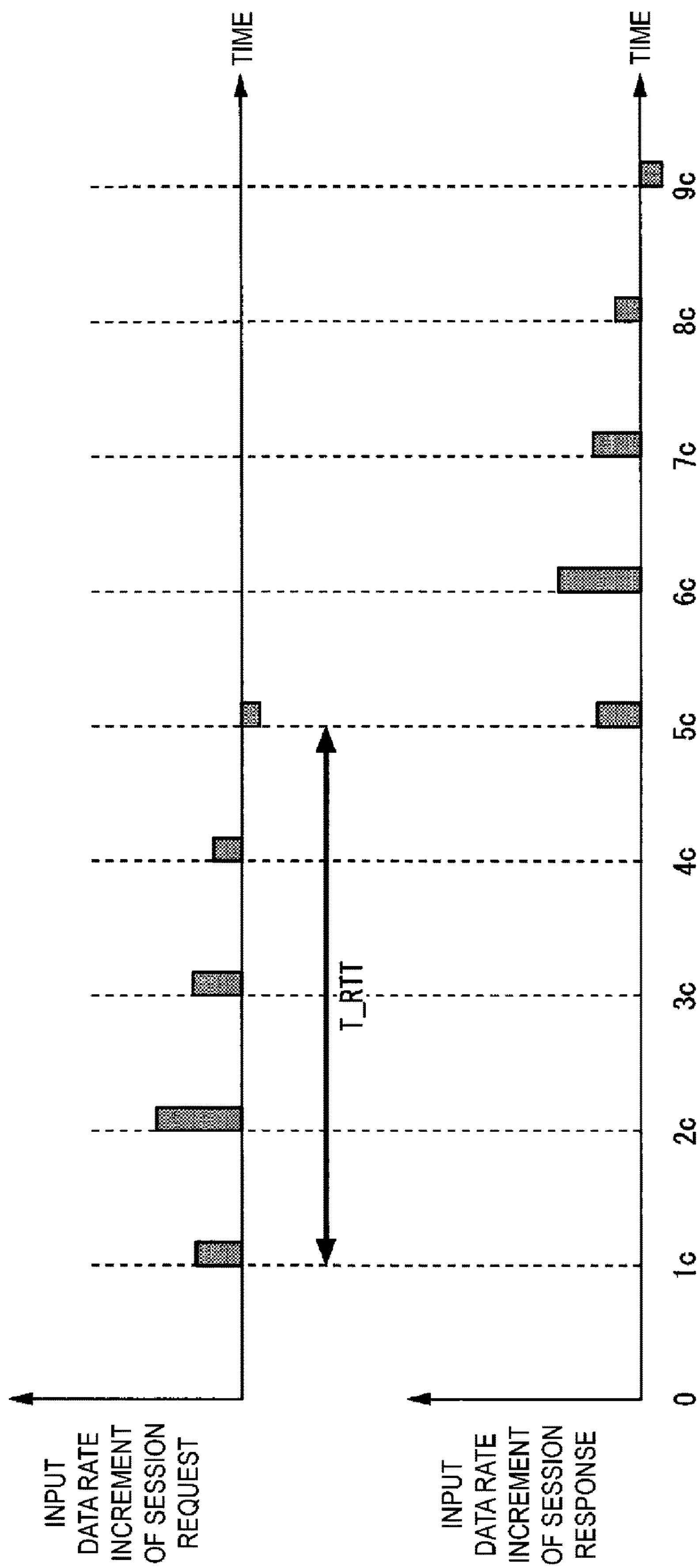
FIG. 18 is a diagram illustrating timing of an input data rate increment of the session response packet used in comparing with an input data rate increment of the session request packet according to the second embodiment.

FIG. 18 is a diagram illustrating a timing of an input data rate increment of the session response packets used in comparing with an input data rate increment of the session request packet. In this figure, the input data rate increment of the session request packets is acquired in discrete times 1c to 5c with the observation cycle as a unit. As illustrated in FIG. 10, the input data rate of the session response packets changes, after an elapse of a certain time T_RTT, in a similar manner to the input data rate of the session request packets. Thus, the shaping start control unit 631 of the NW controller 6 compares the input data rate increment of the session request packets with the input data rate increment of the session response packets shifted backward in timing by T_RTT.

In the example illustrated in this figure, T_RTT is 4c. The shaping start control unit 631 of the NW controller 6 compares the input data rate increment of the session response packets at the discrete time 1c with the input data rate increment of the session request packets at the discrete time 5c (=1c+4c).

The shaping start processing of the network system 1 according to this embodiment is similar to the first embodiment illustrated in FIG. 12, except for the processing in the step S210. That is, in the step S210, the shaping start control unit 631 acquires the input data rate increment of the session response packets from the application server #j from the downlink increment data at the observation cycle closest to the current processing cycle. Further, the shaping start control unit 631 acquires the input data rate increment of the session request packets addressed to the application server #j from the uplink increment data at the observation cycle that goes back from the latest observation cycle by T_RTT. The shaping start control unit 631 calculates an input data rate increment ratio that is a ratio between the input data rate increment of the session response packets and the input data rate increment of the session request packets, and determines whether the input data rate increment ratio is larger than a threshold.

The threshold is a value that is sufficiently smaller than 1. When determining that the input data rate increment ratio is larger than the threshold (YES in step S210), the shaping start control unit 631 adds 1 to the value of the variable j, and executes the processing from the step S205. On the contrary, when determining that the input data rate increment ratio is the threshold or less (NO in step S210), the shaping start control unit 631 determines that temporary depletion of the processing capacity of the application server #j or burst traffic has occurred (step S215).

Note that, instead of the increment of the input data rate, an increment of the input data amount or an increment of the number of input packets can be used. In this case, the uplink increment data indicates the increment of the input data amount or the increment of the number of input packets of the uplink packets for each application server 2 and each packet type. The increment of the input data amount or the increment of the number of input packets of the uplink packets is acquired by subtracting the input data amount or the number of input packets indicated by the uplink data at the previous observation cycle from the input observation data amount or the number of input packets indicated by the uplink observation data. The downlink increment data indicates the increment of the input data amount or the increment of the number of input packets of the downlink packets for each application server 2 and each packet type. The increment of the input data amount or the increment of the number of input packets of the downlink packets is acquired by subtracting the input data amount or the number of input packets indicated by the downlink observation data at the previous observation cycle from the input data amount or the number of input packets indicated by the downlink observation data.

Then, in the step S210, the shaping start control unit 631 acquires the increment of the input data amount or the increment of the number of input packets of the session response packets from the application server #j from the downlink increment data in the observation nearest to the current processing cycle. Further, the shaping start control unit 631 acquires the increment of the input data amount or the increment of the number of input packets of the session request packets addressed to the application server #j from the uplink increment data at the observation cycle that goes back from the latest observation cycle by T_RTT. The shaping start control unit 631 calculates a ratio between an increment of the input data amount or an increment of the number of input packets of the session response packets and an increment of the input data amount or an increment of the number of input packets of the session request packets, and determines whether the ratio is larger than a threshold.

The shaping end processing of the network system 1 according to the present embodiment is similar to the shaping end processing in the first embodiment illustrated in FIG. 13, except for the processing in the steps S305 and S310. That is, the shaping end control unit 632 acquires the input data rate increment of the session response packets in the L2SW #i from the application server #j from the downlink increment data in the observation cycle nearest to the current processing cycle. Further, the shaping start control unit 631 acquires the input data rate increment of the session request packets addressed to the application server #j in the L2SW #i from the uplink increment data in the observation cycle that goes back from the latest observation cycle by T_RTT. The shaping start control unit 631 calculates an input data rate increment ratio that is a ratio between the input data rate increment of the session response packets and the input data rate increment of the session request packets (step S305). The shaping end control unit 632 determines whether the calculated input data rate increment ratio is larger than a threshold (step S310). A threshold is a value that is sufficiently close to 1 and less than 1, for example, 0.75. The shaping end control unit 632 adds 1 to the value of i and repeats the processing from the step S305 when determining that the input data rate increment ratio is the threshold or less (NO in step S310), and executes the processing in the step S315 when determining that the input data rate increment ratio is larger than the threshold (YES in step S310).

According to the present embodiment, similar to the first embodiment, temporary depletion of the processing capacity of the application server 2 or the occurrence of burst traffic can be detected to reduce traffic of the session response packets in the entire L2NW 4.

Third Embodiment

In the present embodiment, when the input data rate of the session request packets in the L2SW 5 exceeds the input data rate that is processible in the application server 2, it is determined that burst traffic of the session request packets has occurred. Hereinafter, differences from the first embodiment will be mainly described.

A network system in the present embodiment is similar to the network system 1 in the first embodiment illustrated in FIG. 1. Also, configurations of the L2SW 5 and NW controller 6 in the present embodiment are similar to the configuration of the L2SW 5 and NW controller 6 illustrated in FIG. 4. However, 61 of the NW controller 6 further stores processing capacity data of each application server 2.

FIG. 19 is a diagram illustrating an example of processing capacity data. The processing capacity data illustrated in this figure indicates the data amount, the data rate, and the data rate increment that is processible in the application server 2 for each identification information of the application server 2 and each packet type. The packet type is represented by whether or not the packet is the session request packet. Note that, in the present embodiment, the data rate and the data rate increment that is processible in the application server 2 need not be set.

Figure 20:
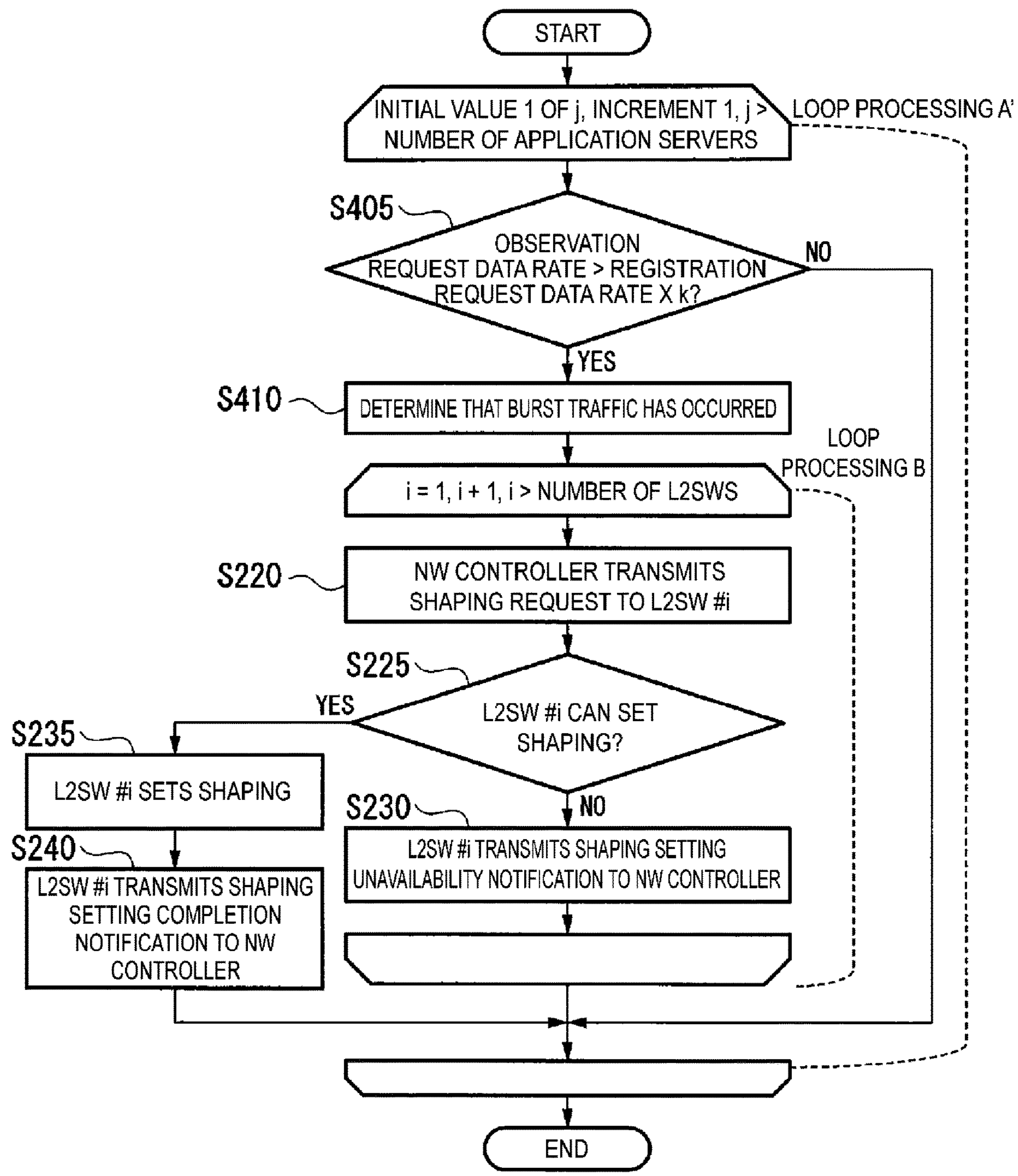
FIG. 20 is a flow chart illustrating a shaping start processing of a network system according to the third embodiment.
Figure 21:
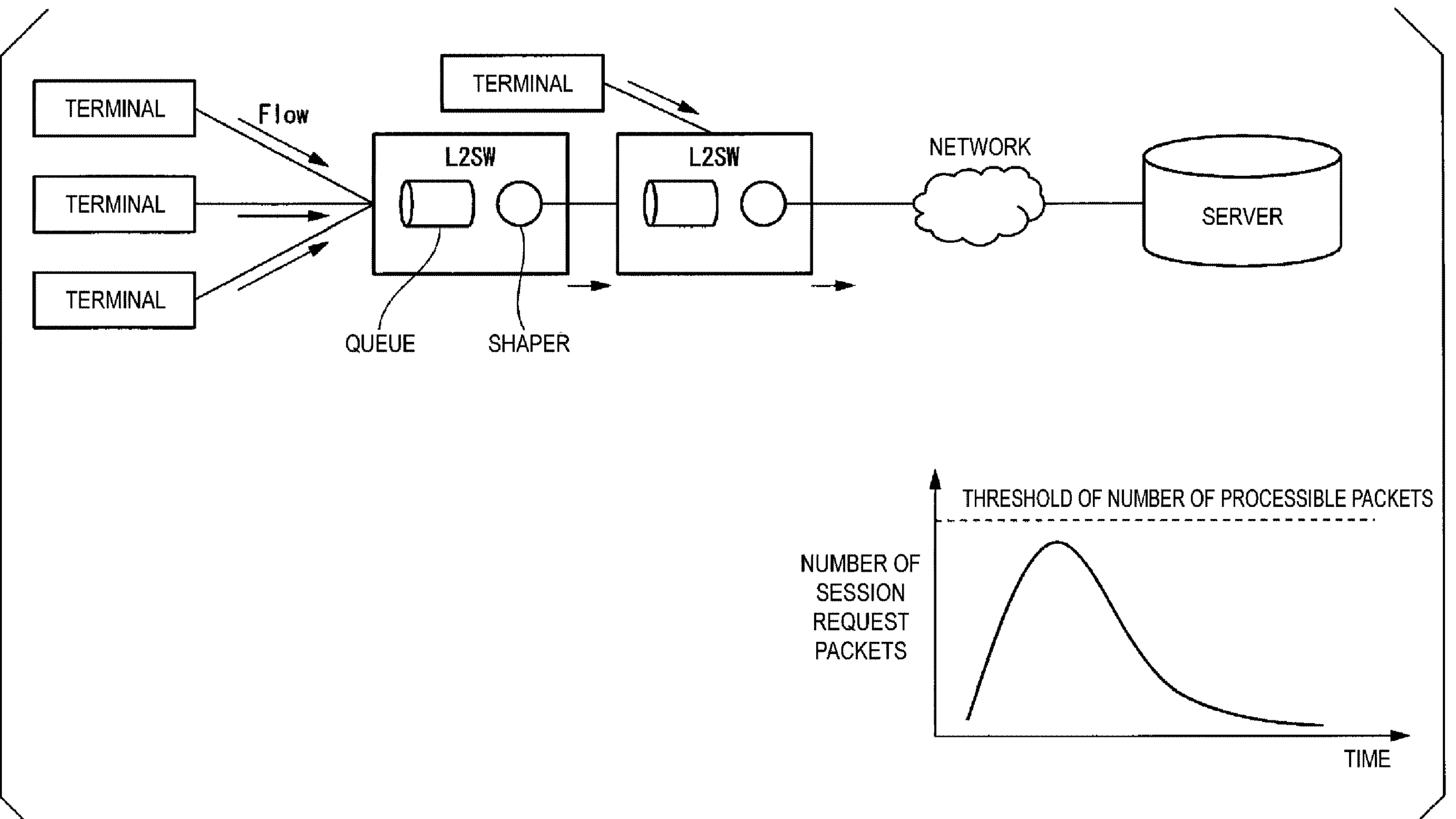
FIG. 21 is a diagram illustrating shaping of packets according to a related art.
Figure 22:
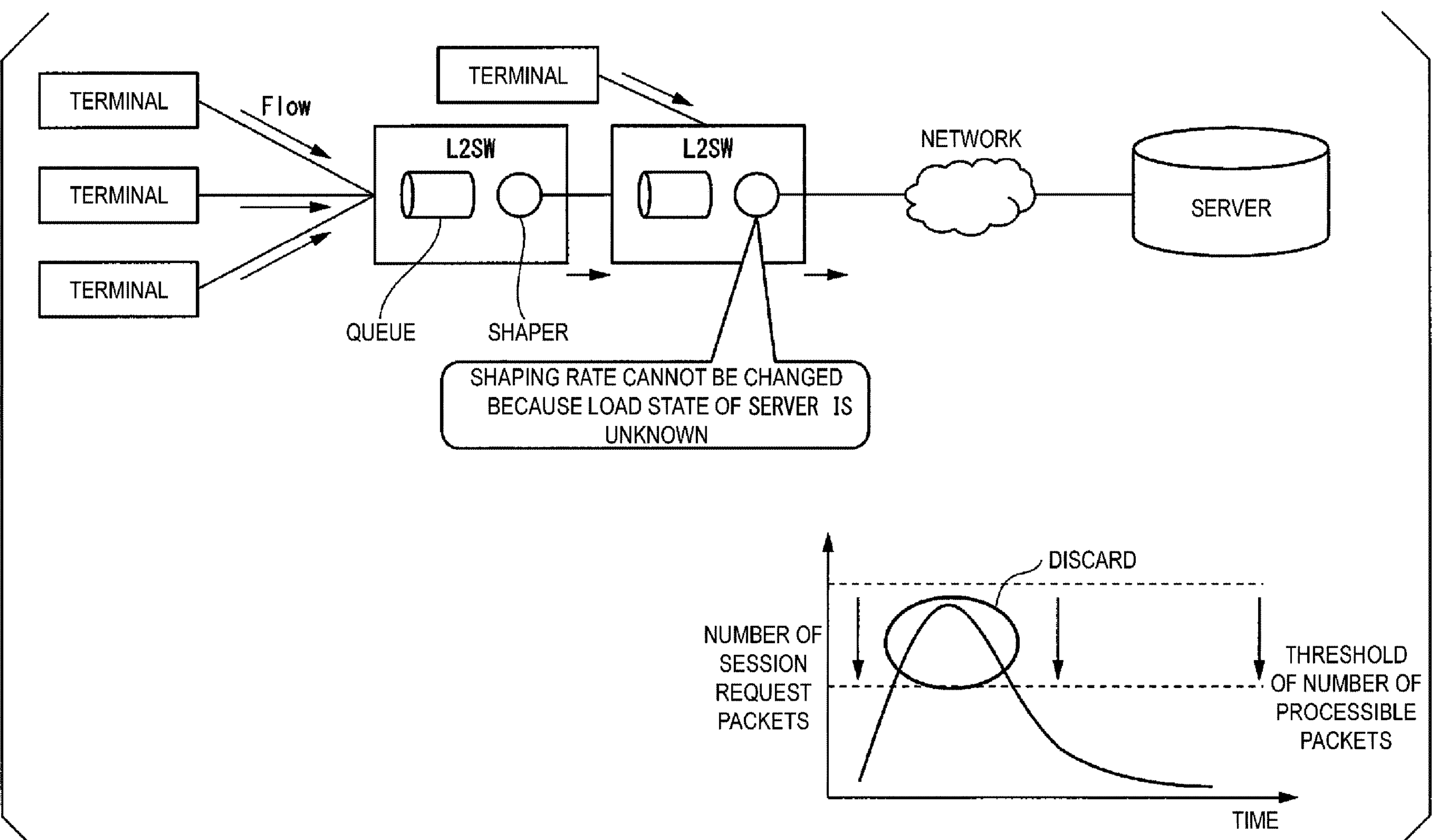
FIG. 22 is a diagram illustrating the occurrence of burst traffic in an L2NW according to the related art.

FIG. 20 is a flow chart illustrating shaping start processing in the network system 1 in the present embodiment. In this figure, the same processes as those in the flowchart according to the first embodiment in FIG. 12 are denoted by the same reference signs and detailed descriptions thereof are omitted.

First, the shaping start control unit 631 initializes the variable j to 1. The shaping start control unit 631 performs loop processing A' in steps S405 to S240 described below for the application server #j, which is the jth application server 2.

The shaping start control unit 631 acquires an input data rate of the session request packets addressed to the application server #j from uplink observation data at the latest observation cycle, and sets the input data rate as an observation request data rate. Further, the shaping start control unit 631 acquires, from the processing capacity data, the data amount of the session request packets that is processible in the application server #j, and sets the data amount as registration request data rate. The shaping start control unit 631 determines whether the observation request data rate exceeds the registration request data rate×k (k is a coefficient) (step S405).

At this time, the shaping start control unit 631 may make a determination on the observation request data rate acquired for each of all or some of the L2SWs 5 constituting the L2NW 4, or may make a determination on the observation request data rate calculated collectively for all or multiple L2SWs 5. For example, the shaping start control unit 631 may calculate the observation request data rate to the application server #j in the entire L2NW 4 based on the observation data of one or more L2SWs 5, and use the observation request data rate for the determination. As an example, the shaping start control unit 631 may use the observation request data rates calculated collectively for the L2SWs 5 separated from the application server #j by one hop. Note that in determining the observation request data rate calculated for each of the L2SWs 5, the shaping start control unit 631 determines NO in the step S405 when the observation request data rate for all of the L2SWs 5 is the registration request data rate×k or less, and determines YES in the step S405 when the observation request data rate for any of the L2SWs 5 exceeds the registration request data rate×k. The value of the coefficient k may be common to the L2SWs 5, or may be different among the L2SWs 5 depending on the number of hops from the application server 2, or the number of downstream L2SWs 5 or terminals 3. The processing capacity data corresponding to the number of hops, or the number of downstream L2SWs 5 or terminals 3 may be held in the storage unit 61, and the registration request data rate may be read from the processing capacity data corresponding to the L2SW 5 for which the observation request data rate has been acquired.

When determining that the observation request data rate is the registration request data rate×k or less (NO in step S405), the shaping start control unit 631 adds 1 to the value of the variable j, and executes the processing again from the step S405. On the contrary, when determining that the observation request data rate is larger than the registration request data rate×k (YES in step S405), the shaping start control unit 631 determines that burst traffic addressed to the application server #j has occurred (step S410), and executes loop processing B in the same manner as in the first embodiment. Thus, shaping is set to the L2NW 4 that is as close to the application server #j as possible, thereby reducing the shaping rate of a flow with burst traffic and suppressing the session request packets arriving at application server #j at the same time.

For example, the shaping start control unit 631 instructs the L2SW 5 to reduce the data rates of the session request packet or all packets addressed to application server #j in the L2SW 5 to the input data rate that is processible in the application server #j. The input data rate that is processible in the application server #j may be, for example, common to all L2SWs 5, or may be determined for each L2SW 5. The processible input data rate may be the registration request data rate of the application server #j, or may be a value acquired by multiplying the registration request data rate by a coefficient corresponding to the number of hops from the application server 2 to the L2SW 5, or the L2NWs 4 or the terminals 3 subordinate to the L2SW 5.

According to the present embodiment, by acquiring the processible data rate from the application server 2 in advance, the occurrence of burst traffic can be determined to reduce traffic volume addressed to the application server 2.

Fourth Embodiment

In the third embodiment, when the input data rate of the session request packets in the L2SW 5 exceeds the data rate that is processible in the application server 2, it is determined that burst traffic of the session request packets has occurred. In the present embodiment, when the input data amount of the session request packets in the L2SW 5 exceeds the data amount that is processible in the application server 2, it is determined that burst traffic of the session request packets has occurred. Hereinafter, differences from the third embodiment will be mainly described.

A network system in the present embodiment is similar to the network system 1 in the first embodiment illustrated in FIG. 1. Also, configurations of the L2SW 5 and NW controller 6 in the present embodiment are similar to the configuration of the L2SW 5 and NW controller 6 illustrated in FIG. 4. The storage unit 61 of the NW controller 6 stores processing capacity data illustrated in FIG. 19. However, the processing capacity data may not include the data rate and data rate increment that is processible in the application server 2.

The shaping start processing of the network system 1 according to the present embodiment is similar to the shaping start processing in the third embodiment illustrated in FIG. 20, except for the processing of the step S405. That is, in the step S405, the shaping start control unit 631 acquires an input data amount of the session request packets addressed to the application server #j from uplink observation data at the latest observation cycle, and sets the input data amount as observation request data. Further, the shaping start control unit 631 acquires, from the processing capacity data, the data amount of the session request packets that is processible in the application server #j, and sets the data amount as registration request data. The shaping start control unit 631 determines whether the observation request data amount exceeds the registration request data amount×k (k is a coefficient). When determining that the observation request data amount is the registration request data amount×k or less (NO in step S405), the shaping start control unit 631 adds 1 to the value of the variable j, and executes the processing again from the step S405. On the contrary, when determining that the observation request data amount is larger than the registration request data amount×k (YES in step S405), the shaping start control unit 631 determines that burst traffic addressed to the application server #j has occurred (step S410), and executes loop processing B in the same manner as in the first embodiment.

Fifth Embodiment

In a fifth embodiment, when an increment of the input data rate of the session request packets in the L2SW 5 exceeds an increment of the data rate that is processible in the application server 2, it is determined that burst traffic of the session request packets has occurred. Hereinafter, differences from the third embodiment will be mainly described.

A network system in the present embodiment is similar to the network system 1 in the first embodiment illustrated in FIG. 1. Also, configurations of the L2SW 5 and NW controller 6 in the present embodiment are similar to the configuration of the L2SW 5 and NW controller 6 illustrated in FIG. 4.

As in the first embodiment, the data collection unit 62 of the NW controller 6 periodically receives the observation data including the uplink observation data illustrated in FIG. 7 and the downlink observation data illustrated in FIG. 8 every observation cycle from each L2NW 4, and writes the observation data into the storage unit 61. Further, the data collection unit 62 uses the collected uplink observation data and uplink observation data at the previous observation cycle to calculate the input data rate increment of the uplink packets in each L2NW 4 for each application server 2 and each packet type, and registers the input data rate increment with the storage unit 61. That is, when storing the observation data in the storage unit 61, the data collection unit 62 writes the uplink observation data at the previous observation cycle as the uplink observation data at the previous cycle in FIG. 14 into the storage unit 61, generates the uplink increment data illustrated in FIG. 15 using the uplink observation data and the uplink observation data at the previous cycle, and writes the uplink increment data into the storage unit 61.

The shaping start processing of the network system 1 according to the present embodiment is similar to the shaping start processing in the third embodiment illustrated in FIG. 20, except for the processing of the step S405. That is, in the step S405, the shaping start control unit 631 acquires an input data rate increment of the session request packets addressed to the application server #j from uplink increment data at the latest observation cycle, and sets the input data rate increment as observation increment data. Further, the shaping start control unit 631 acquires, from the processing capacity data, the rate increment of the session request packets that is processible in the application server #j, and sets the rate increment as registration increment data. The shaping start control unit 631 determines whether the observation increment data exceeds the registration increment data×k (k is a coefficient). When determining that the observation increment data is the registration increment data×k or less (NO in step S405), the shaping start control unit 631 adds 1 to the value of the variable j, and executes the processing again from the step S405. On the other hand, when determining that the observation increment data is larger than the registration increment data×k (YES in step S405), the shaping start control unit 631 determines that burst traffic addressed to the application server #j has occurred (step S410), and executes loop processing B in the same manner as in the first embodiment.

The shaping end processing of the network system 1 according to the present embodiment is the same as the shaping end processing in the second embodiment, but may be the same as the shaping end processing in the first embodiment.

The NW controller 6 includes a central processing unit (CPU), a memory, an auxiliary storage device, or the like connected through a bus and functions as described above by executing a program. Some or all of the functions of each of NW controller 6 may be provided using hardware such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disk, a ROM or a CD-ROM, or a storage device such as a hard disk drive built into a computer system. The program may be transmitted over an electrical communication line.

According to the above-described embodiment, the network system relays a packet between a first communication device and a second communication device via a relay network constituted of one or more relay devices. For example, the relay device is the L2SW 5, the relay network is the L2NW 4, the first communication device is the terminal 3, and the second communication device is the application server 2. The network control device (network control apparatus) includes a data collection unit and a control unit. For example, the network control device is the NW controller 6.

The data collection unit collects, from the relay device, uplink observation data indicating traffic volume of a processing request packet from the first communication device to the second communication device and downlink observation data indicating traffic volume of a response packets transmitted from the second communication device to the first communication device in response to the processing request packets, which are acquired by observing the packets input to the relay device. For example, the processing request packet is a session request packet that requests the start of session, and the response packet is a session response packet indicating a response to the session request packet. For example, traffic volume is an input data rate, an input data amount, or the number of input packets to the relay device.

The control unit changes the shaping rate in the relay device included in the relay network, the shaping rate being a speed at which the packets addressed to the second communication device passes through the relay device, based on a ratio between the traffic volume indicated by the uplink observation data and the traffic volume indicated by the downlink observation data or a ratio between an increment of the traffic volume acquired from the uplink observation data and an increment of the traffic volume acquired from the downlink observation data.

For example, the control unit detects the occurrence or end of burst traffic of the processing request packets addressed to the second communication device based on the above-mentioned ratio, decreases the shaping rate when the occurrence is detected, and increases the shaping rate when the end is detected. For example, when detecting the end of burst traffic, the control unit returns the shaping rate to the shaping rate set before the occurrence of the burst traffic.

The control unit may detect the occurrence of burst traffic of the processing request packets addressed to the second communication device based on the comparison of the traffic volume indicated by the uplink observation data and the traffic volume of the processing request packets that is processible in the second communication device or based on the comparison of the traffic volume increment acquired from the uplink observation data and the traffic volume of the processing request packets that is processible in the second communication device.

In addition, the control unit may transmit, until the receipt of a notification that the shaping rate can be changed, a shaping rate change request to each of the relay devices included in the relay network, in ascending order of distance from the second communication device.

The embodiments of the present invention have been described above in detail with reference to the drawings. However, specific configurations are not limited to those embodiments, and include any design or the like within the scope not departing from the gist of the present invention.

REFERENCE SIGNS LIST

1, **1*b*** Network system
2-1, 2-2 Application server
3 Terminal
4, **4*a*, 4*b*** L2NW
5 L2SW
6 NW controller
7 L3 network
51 First port
52 Matching unit
53 Counter unit
54 Queue
55 Shaper
56 Second port
57 Notification unit
58 Control unit
61 Storage unit
62 Data collection unit
63 Control unit
631 Shaping start control unit
632 Shaping end control unit

The invention claimed is:

1. A network control device, comprising:

a data collector configured to collect, from a relay device in a network system in which a packet is relayed between a first communication device and a second communication device via a relay network including one or more of the relay devices, uplink observation data indicating traffic volume of a processing request packet addressed to the second communication device from the first communication device and downlink observation data indicating traffic volume of a response packet transmitted from the second communication device in response to the processing request packet, the uplink observation data and the downlink observation data being acquired by observing the packet input to the relay device;

a controller configured to change a shaping rate in the relay device included in the relay network, the shaping rate being a speed at which the packet addressed to the second communication device passes through the relay device, based on a ratio between the traffic volume in a first period indicated by the uplink observation data and the traffic volume in a second period indicated by the downlink observation data, or a ratio between an increment of the traffic volume in the first period acquired from the uplink observation data and an increment of the traffic volume in the second period acquired from the downlink observation data; and wherein the second period is the time passed after the first period by the sum of the round-trip propagation delay from the relay device to the second communication device and the processing delay in the second communication device.

2. The network control device according to claim 1, wherein the traffic volume is an input data rate, an input data amount, or the number of input packets to the relay device.

3. The network control device according to claim 1, wherein the controller is configured to detect an occurrence or an end of burst traffic of the processing request packet addressed to the second communication device, based on the ratio between the traffic volume in the first period indicated by the uplink observation data and the traffic volume in the second period indicated by the downlink observation data or the ratio between the increment of the traffic volume in the first period acquired from the uplink observation data and the increment of the traffic volume in the second period acquired from the downlink observation data, decrease the shaping rate when the occurrence is detected, and increase the shaping rate when the end is detected.

4. The network control device according to claim 3, wherein the controller is configured to detect the occurrence of burst traffic of the processing request packet addressed to the second communication device, based on a comparison of the traffic volume indicated by the uplink observation data and the traffic volume of the processing request packets that is processible in the second communication device, or based on a comparison of the increment of the traffic volume acquired from the uplink observation data and the increment of the traffic volume of the processing request packet that is processible in the second communication device.

5. The network control device according to claim 1, wherein the controller is configured to transmit, until receipt of a notification that the shaping rate is changeable, a shaping rate change request to each of the relay devices included in the relay network, in ascending order of distance from the second communication device.

6. The network control device according to claim 1 wherein:

the relay network is a layer 2 network; and the relay device is a layer 2 switch.

7. The network control device according to claim 1, wherein:

the processing request packet is a session request packet that requests start of a session; and the response packet is a session response packet that indicates a response to the session request packet.

8. A network control method, comprising:

collecting, from a relay device in a network system in which a packet is relayed between a first communication device and a second communication device via a relay network including one or more of the relay devices, uplink observation data indicating traffic volume of a processing request packet addressed to the second communication device from the first communication device and downlink observation data indicating traffic volume of a response packet transmitted from the second communication device in response to the processing request packet, the uplink observation data and the downlink observation data being acquired by observing the packet input to the relay device;

changing a shaping rate in the relay device included in the relay network, the shaping rate being a speed at which the packet addressed to the second communication device passes through the relay device, based on a ratio between the traffic volume in a first period indicated by the uplink observation data and the traffic volume in a second period indicated by the downlink observation data, or a ratio between an increment of the traffic volume in the first period acquired from the uplink observation data and an increment of the traffic volume in the second period acquired from the downlink observation data; and wherein the second period is the time passed after the first period by the sum of the round-trip propagation delay from the relay device to the second communication device and the processing delay in the second communication device.

* * * * *